US 8,869,889 B2

(12) United States Patent
Palmer et al.

(10) Patent No.: US 8,869,889 B2
(45) Date of Patent: Oct. 28, 2014

(54) METHOD OF USING CARBON DIOXIDE IN RECOVERY OF FORMATION DEPOSITS

(75) Inventors: Miles Palmer, Chapel Hill, NC (US); Rodney John Allam, Chippenham (GB); Jeremy Eron Fetvedt, Raleigh, NC (US); David Arthur Freed, Chapel Hill, NC (US); Glenn William Brown, Jr., Durham, NC (US)

(73) Assignees: Palmer Labs, LLC, Durham, NC (US); 8 Rivers Capital, LLC, Durham, NC (US)

( * ) Notice: Subject to any disclaimer, the term of this patent is extended or adjusted under 35 U.S.C. 154(b) by 222 days.

(21) Appl. No.: 13/236,095

(22) Filed: Sep. 19, 2011

(65) Prior Publication Data

US 2012/0067568 A1 Mar. 22, 2012

Related U.S. Application Data

(60) Provisional application No. 61/506,429, filed on Jul. 11, 2011, provisional application No. 61/385,069, filed on Sep. 21, 2010.

(51) Int. Cl.
*E21B 43/243* (2006.01)
*E21B 36/02* (2006.01)
*E21B 43/16* (2006.01)
*E21B 43/40* (2006.01)

(52) U.S. Cl.
CPC .............. *E21B 36/02* (2013.01); *E21B 43/164* (2013.01); *E21B 43/40* (2013.01)
USPC ........ 166/260; 166/75.12; 166/90.1; 166/402

(58) Field of Classification Search
None
See application file for complete search history.

(56) References Cited

U.S. PATENT DOCUMENTS

| 2,658,332 A | 11/1953 | Nicholson |
| 3,075,918 A | 1/1963 | Holm |
| 3,376,706 A | 4/1968 | Angelino |
| 3,503,208 A | 3/1970 | Schmidt |
| 3,623,711 A | 11/1971 | Thorstenson |
| 3,736,745 A | 6/1973 | Karig |

(Continued)

FOREIGN PATENT DOCUMENTS

| DE | 3514974 | 10/1986 |
| DE | 3519159 | 12/1986 |

(Continued)

OTHER PUBLICATIONS

Boland, "A Thermodynamic Comparison of the Oxy-Fuel Power Cycles Water-Cycle, Graz-Cycle and Matiant-Cycle," *Norwegian University of Science and Technology*, Trondheim, Norway. http://www.graz-cycle.tugraz.at/pdfs/Bolland_Kvamsdal_Boden_Liege.pdf.

(Continued)

*Primary Examiner* — Zakiya W Bates
(74) *Attorney, Agent, or Firm* — Womble Carlyle Sandridge & Rice, LLP

(57) ABSTRACT

The present invention relates to systems, apparatuses, and methods for providing a reliable, high purity source of $CO_2$ that is used in the recovery of formation deposits, such as fossil fuels. At least a portion of the fossil fuels recovered may be directly combusted or extracted using the same process used to provide the pure source of $CO_2$ without the need to first remove $CO_2$, sulfur, other fossil fuels, or other impurities.

41 Claims, 4 Drawing Sheets

(56) References Cited

U.S. PATENT DOCUMENTS

| | | |
|---|---|---|
| 3,793,861 A | 2/1974 | Burkhard et al. |
| 3,837,788 A | 9/1974 | Craig et al. |
| 3,921,544 A | 11/1975 | Reese |
| 3,971,211 A | 7/1976 | Wethe et al. |
| 3,976,443 A | 8/1976 | Paull et al. |
| 4,154,581 A | 5/1979 | Nack et al. |
| 4,191,500 A | 3/1980 | Oberg et al. |
| 4,193,259 A | 3/1980 | Muenger et al. |
| 4,206,610 A | 6/1980 | Santhanam |
| 4,461,154 A | 7/1984 | Allam |
| 4,498,289 A | 2/1985 | Osgerby |
| 4,522,628 A | 6/1985 | Savins |
| 4,602,483 A | 7/1986 | Wilks et al. |
| 4,702,747 A | 10/1987 | Meyer et al. |
| 4,721,420 A | 1/1988 | Santhanam et al. |
| 4,765,143 A | 8/1988 | Crawford et al. |
| 4,765,781 A | 8/1988 | Wilks et al. |
| 4,775,314 A | 10/1988 | Sternling |
| 4,839,030 A | 6/1989 | Comolli et al. |
| 4,852,996 A | 8/1989 | Knop et al. |
| 4,881,366 A | 11/1989 | Nurse |
| 4,999,992 A | 3/1991 | Nurse |
| 4,999,995 A | 3/1991 | Nurse |
| 5,078,760 A | 1/1992 | Haldipur et al. |
| 5,116,394 A | 5/1992 | Garkawe |
| 5,175,995 A | 1/1993 | Pak et al. |
| 5,247,791 A | 9/1993 | Pak et al. |
| 5,265,410 A | 11/1993 | Hisatome |
| 5,353,721 A | 10/1994 | Mansour et al. |
| 5,520,894 A | 5/1996 | Heesink et al. |
| 5,590,519 A | 1/1997 | Almlöf et al. |
| 5,595,059 A | 1/1997 | Huber et al. |
| 5,692,890 A | 12/1997 | Graville |
| 5,709,077 A | 1/1998 | Beichel |
| 5,715,673 A | 2/1998 | Beichel |
| 5,724,805 A | 3/1998 | Golomb et al. |
| 5,802,840 A | 9/1998 | Wolf |
| 5,906,806 A | 5/1999 | Clark |
| 5,937,652 A | 8/1999 | Abdelmalek |
| 6,024,029 A | 2/2000 | Clark |
| 6,117,916 A | 9/2000 | Allam et al. |
| 6,148,602 A | 11/2000 | Demetri |
| 6,151,887 A | 11/2000 | Haidn et al. |
| 6,170,264 B1 | 1/2001 | Viteri et al. |
| 6,196,000 B1 | 3/2001 | Fassbender |
| 6,199,364 B1 | 3/2001 | Kendall et al. |
| 6,202,574 B1 | 3/2001 | Liljedahl et al. |
| 6,209,307 B1 | 4/2001 | Hartman |
| 6,234,787 B1 | 5/2001 | Endoh et al. |
| 6,260,348 B1 | 7/2001 | Sugishita et al. |
| 6,263,661 B1 | 7/2001 | Van der Burgt et al. |
| 6,269,624 B1 | 8/2001 | Frutschi et al. |
| 6,298,664 B1 | 10/2001 | Åsen et al. |
| 6,333,015 B1 | 12/2001 | Lewis |
| 6,360,561 B2 | 3/2002 | Allam et al. |
| 6,389,814 B2 | 5/2002 | Viteri et al. |
| 6,430,916 B2 | 8/2002 | Sugishita et al. |
| 6,436,337 B1 | 8/2002 | Gross |
| 6,532,745 B1 | 3/2003 | Neary |
| 6,536,205 B2 | 3/2003 | Sugishita et al. |
| 6,543,214 B2 | 4/2003 | Sasaki et al. |
| 6,550,234 B2 | 4/2003 | Guillard |
| 6,596,220 B2 | 7/2003 | Gross |
| 6,598,398 B2 | 7/2003 | Viteri et al. |
| 6,606,851 B1 | 8/2003 | Herdy, Jr. et al. |
| 6,612,113 B2 | 9/2003 | Guillard |
| 6,617,003 B1 | 9/2003 | Lee et al. |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,820,689 B2 | 11/2004 | Sarada |
| 6,824,710 B2 | 11/2004 | Viteri et al. |
| 6,862,877 B1 | 3/2005 | James |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,111,463 B2 | 9/2006 | Sprouse et al. |
| 7,124,589 B2 | 10/2006 | Neary |
| 7,147,461 B2 | 12/2006 | Neary |
| 7,186,091 B2 | 3/2007 | Lee et al. |
| 7,191,587 B2 | 3/2007 | Marin et al. |
| 7,192,569 B2 | 3/2007 | Stewart |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,396 B2 | 2/2008 | Erickson et al. |
| 7,334,631 B2 | 2/2008 | Kato et al. |
| 7,360,639 B2 | 4/2008 | Sprouse et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,516,607 B2 | 4/2009 | Farhangi et al. |
| 7,516,609 B2 | 4/2009 | Agnew |
| 7,516,620 B2 | 4/2009 | Patrick et al. |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,717,046 B2 | 5/2010 | Sprouse et al. |
| 7,722,690 B2 | 5/2010 | Shires et al. |
| 7,731,783 B2 | 6/2010 | Sprouse et al. |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,827,794 B1 | 11/2010 | Pronske et al. |
| 7,882,692 B2 | 2/2011 | Pronske et al. |
| 7,927,574 B2 | 4/2011 | Stewart |
| 7,980,312 B1* | 7/2011 | Hill et al. .................. 166/303 |
| 2003/0131582 A1 | 7/2003 | Anderson et al. |
| 2004/0011057 A1 | 1/2004 | Huber |
| 2005/0126156 A1 | 6/2005 | Anderson et al. |
| 2005/0135984 A1 | 6/2005 | Ferron et al. |
| 2006/0242907 A1 | 11/2006 | Sprouse et al. |
| 2007/0180768 A1 | 8/2007 | Briesch et al. |
| 2007/0193748 A1 | 8/2007 | Ware et al. |
| 2007/0274876 A1 | 11/2007 | Chiu et al. |
| 2008/0010967 A1 | 1/2008 | Griffin et al. |
| 2008/0083537 A1 | 4/2008 | Klassen et al. |
| 2008/0104958 A1 | 5/2008 | Finkenrath et al. |
| 2008/0115500 A1 | 5/2008 | MacAdam et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0061264 A1 | 3/2009 | Agnew |
| 2009/0180939 A1* | 7/2009 | Hagen et al. .................. 422/194 |
| 2009/0229271 A1 | 9/2009 | De Ruyck et al. |
| 2009/0255450 A1 | 10/2009 | Stone et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0155048 A1 | 6/2010 | Hackett et al. |

(56) References Cited

U.S. PATENT DOCUMENTS

| 2010/0243245 A1 | 9/2010 | Khinkis et al. |
| 2011/0036011 A1 | 2/2011 | Sprouse et al. |
| 2011/0126549 A1 | 6/2011 | Pronske et al. |

FOREIGN PATENT DOCUMENTS

| DE | 4443077 | 6/1996 |
| DE | 4244921 | 2/1998 |
| EP | 1 816 314 | 8/2007 |
| WO | WO 2005/114050 | 12/2005 |
| WO | WO 2009/007356 | 1/2009 |
| WO | WO 2009/134643 | 5/2009 |
| WO | WO 2010/076282 | 7/2010 |
| WO | WO 2010/099452 | 9/2010 |
| WO | WO 2010/103275 | 9/2010 |

OTHER PUBLICATIONS

Combs, Jr. "An investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institue of Technology*, 148.

Dostal, et al., "A Supercritical Carbon Dioxide Cycle for Next Generation Nuclear Reactors," 2004, (*Research Paper*) *Advanced Nuclear Power Technology Program at MIT*,326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

Issever et al. "Use of Carbon Dioxide to Enhance Heavy Oil Recovery," 7th UNITAR International Conference for Heavy Crude and Tar Sands, No. 1998.141, Beijing China, Oct. 27-30, 1998. http://www.oildrop.org/Lib/Conf/7thtoc.html.

Wall et al., "A Zero Emission Combustion Power Plant for Enhanced Oil Recovery," *Energy*, 1995, pp. 823-828, vol. 20, No. 8.

Yantovskii et al., "Computer Exergonomics of Power Plants Without Exhaust Gases," Energy Convers. Mgmt., Publ. 1992, vol. 33, No. 5-8, pp. 405-412.

http://www2.ule.ac.be/genienuc/pageco2.htm: Université de Liége, Department of Power Generation, "CO2 Researches".

* cited by examiner

//...
METHOD OF USING CARBON DIOXIDE IN RECOVERY OF FORMATION DEPOSITS

CROSS-REFERENCE TO RELATED APPLICATIONS

The present application claims priority to U.S. Provisional Patent Application No. 61/506,429, filed Jul. 11, 2011, and U.S. Provisional Patent Application No. 61/385,069, filed Sep. 21, 2010, the disclosures of which are both incorporated herein by reference in their entireties.

FIELD OF THE INVENTION

The present invention is directed to systems and methods for use of $CO_2$ in the recovery of formation deposits. In particular, the invention provides systems and methods for directing $CO_2$ from a combustion process into a geologic formation to facilitate recovery of one or more formation deposits from the geologic formation, such as fuel material deposits.

BACKGROUND OF THE INVENTION

Numerous useful materials for energy production are found naturally in the earth. For example, fossil fuels (e.g., crude oil, natural gas, and coal) are located as deposits in various rock formations throughout the world, and man has been recovering such materials for many years through mining, drilling, and the like. As more readily obtainable deposits are exhausted, advanced techniques to facilitate the recovery of the useful materials are continually being sought.

As an example, the use of fluids and fluidized mixtures for enhancing the recovery of various fossil fuels has been under development for several years. The mechanisms for enhanced recovery generally are based on enhancing the flow of the fossil fuel through its surrounding geologic formation toward an extraction well. Three predominant mechanisms for enhancing fossil fuel recovery in this manner include the following: 1) using fluids for creating and sustaining fractures in rocky formations to promote more free flow passages; 2) relying on the injection of fluids for volumetric or pressurized displacement of the fossil fuel; and 3) commingling the fluid with the fossil fuel such that one or both of the density and viscosity of the fossil fuel is reduced. Viscosity also may be reduced by mixing other materials into the fossil fuel, by heating the fossil fuel, or both. All of these mechanisms involve injecting material into a well or wells, and then obtaining increased fossil fuel output from the injection well or wells (or from one or more other wells in the vicinity).

Fracturing as a method to enhance fossil fuel recovery typically is done from a wellbore drilled into a reservoir rock formation. A hydraulic fracture can be formed by pumping the fracturing fluid into the wellbore at a rate sufficient to increase the pressure down-hole to a value in excess of the fracture gradient of the formation rock. The pressure causes the formation to crack, allowing the fracturing fluid to enter and extend the crack further into the formation. To keep this fracture open after the injection stops, a solid proppant usually is added to the fracture fluid. The proppant, which is commonly a sieved round sand, is carried into the fracture. This sand is chosen to be higher in permeability than the surrounding formation, and the propped hydraulic fracture then becomes a high permeability conduit through which the formation fluids can flow to the well. A variety of fluids have been proposed and used as fracture fluids, displacement fluids, and viscosity reduction fluids to enhance recovery for fossil fuel reservoirs. Existing methods, however, employ fluids with highly controversial environmental impacts, less than desired effectiveness, or high cost, or a combination of these factors. Some environmental and human health concerns that have been suggested to be associated with fluids typically used in prior art hydraulic fracturing include the potential mishandling of solid toxic waste, potential risks to air quality, potential contamination of ground water, and the unintended migration of gases and hydraulic fracturing chemicals to the surface within a given radius of drilling operations.

Fluids, such as water and steam, with or without surfactants and with or without high heat values, have often shown less than desired performance for enhancing fossil fuel recovery. Key reasons are that water can be much denser than certain fossil fuels, and water is a liquid under equilibrium conditions. Such chemical factors limit or largely eliminate miscibility and mixing between the water/steam and the hydrophobic fossil fuel, thus limiting or largely eliminating any reduction in viscosity of the fossil fuel. The higher density of water can lead to initial physical displacement of the fossil fuel, but this effect is often limited in time and efficiency to an undesirable extent. The denser water may flow downward and away from the fossil fuel reservoir, quickly decreasing or eliminating any displacement effect.

Supercritical carbon dioxide can be highly useful for enhancing oil recovery. Specifically, the supercritical fluid nature and chemical nature of the material causes it to be miscible with oil to lower the viscosity and density of the oil, and/or to improve the oil flow through the formation. Also, the density of supercritical carbon dioxide is substantially lower than the density of water, and it therefore tends to rise into the fossil fuel reservoir rather than to flow downward as does denser water. Furthermore, the material properties of the supercritical $CO_2$ allow it to function as a better solvent for other materials as well. Specifically, as compared to gaseous or liquid $CO_2$, supercritical $CO_2$ exhibit material properties that can substantially increase its dissolution properties. Presently, in order to use supercritical carbon dioxide in recovery methods, the $CO_2$ must be transported from its source (either natural or anthropogenic) to a site of use.

As much as 70% of oil presently in formations is unrecoverable without the use of enhanced oil recovery methods, particularly $CO_2$ led EOR. Despite its potential, there are several limiting factors with EOR in the current art. Primarily, the industrial creation of purified $CO_2$ is overly expensive to separate, purify, and compress in use for EOR as it normally requires large capital and operating investments in the form of system additions, such as amine and/or other solvent scrubbers. Even thereafter, the $CO_2$ must be compressed to a sufficient pressure to inject into the well. These systems are not only expensive and potentially hazardous to the environment, but also require energy, thus limiting the efficiency of the overall system. Secondly, pipeline networks are needed and are not sufficient in the majority of locations where EOR is a possibility, thus limiting its exposure to a significant number of formations. In current instances, pipeline networks have been fed from geologic $CO_2$ sources. However, these are extremely limited in location and amounts of $CO_2$ available.

Moreover, in an economic and political backdrop where $CO_2$ emissions are tightly monitored and always discouraged, it is generally undesirable to open $CO_2$ deposits that already are geologically sequestered.

When fossil fuels are removed from underground deposits using enhanced recovery methods, they often contain dissolved $CO_2$ and other impurities which must be separated using processes such as absorption processes. These can include the following: chemical, physical, and/or solid surface processes; physical separation through membrane or cryogenic means; or hybrid solutions that offer mixed physical and chemical solvents. Such processes may include, but are not limited to, the expensive and inefficient Ryan/Holmes process, the Low-Temperature Separator (LTX) process, the FLUOR amine process, the Selexol process, the Rectisol process, and others. These processes are used to remove the $CO_2$ content of the natural gas separated from liquid oil so that the useful gas fraction (e.g., $CH_4$ fraction) can be produced at a sufficient purity for sale in pipeline systems and so that $C_2$ and greater hydrocarbon fractions can be separated for sale. Moreover, the processes can be used to process flue gas and/or sour gas before it can be transported or re-used. In some instances where the $CO_2$ content is of sufficient quantity (e.g., greater than 30% by weight or partial pressure), the separated $CO_2$ can be recycled for further EOR duty. Specifically, regarding other impurities, natural gas that contains high amounts of hydrogen sulfides (typically an $H_2S$ content exceeds 5.7 mg per cubic meter) is known as sour gas, and the $H_2S$ must be removed (i.e., so that the natural gas is "sweetened") using processes such as the amine process or Claus process before injection into pipelines. These impurity removal processes can have detrimental effects on the environment, system efficiency, and overall recovery costs.

Even when $CO_2$ is used for enhanced recovery, the recoverable fossil fuels present in a formation are eventually depleted. The $CO_2$ injection system must then be disassembled and either moved to a new location, which may be very distant, or discontinued and scrapped. This requires the installation of $CO_2$ transmission pipelines with significant permitting, time, and expense requirements. Alternately, the disadvantages of moving $CO_2$ to an injection site still can hinder economical and even successful use of $CO_2$ in an enhanced recovery method for fossil fuel.

There particularly is a need for methods of EOR to be applied to the recovery of very heavy oils, such as oil below about 15 API gravity, bitumen, and tar sands. Heavy oil deposits are often recovered by injection of steam produced from surface steam generators or as pass-out steam from a steam based power generation system. These systems are often old, inefficient and highly polluting, particularly with high $CO_2$ emissions. Accordingly there have been efforts to design a heat generation device which is compact enough to be contained within the well bore and which can combust a fossil fuel within the reservoir producing not only heat but also $CO_2$ and steam which act to displace the heated lower viscosity oil. U.S. Pat. No. 4,397,356 describes a down-hole combustor in which a fuel and an oxidant are burned within a burner which includes a catalytic section to ensure complete combustion with no soot formation, which would block the face of the oil reservoir.

Such efforts, however, still fall short of providing sufficient means for enhancing recovery of a wide variety of formation deposits in a wide variety of settings in a manner that is efficient, economical, environmentally friendly, and easily mobilized for transport to different job sites as needed. Accordingly, there remains a need in the field for further systems and methods for enhancing recovery of formation deposits that not only lessen the impact on the environment but also possibly provide solutions to other existing energy generation issues.

SUMMARY OF THE INVENTION

The present invention provides systems and methods for enhancing the recovery of a variety of formation deposits including, but not limited to, fossil fuels and other commodities. Beneficially, enhanced recovery can be achieved using $CO_2$ that can be directed from a combustion process that optionally can provide power while also providing the $CO_2$ used in the enhanced recovery methods.

In various embodiments related to recovery of fossil fuels, the $CO_2$ can be used for creating and sustaining fractures in rocky formations to promote more free flow passages for the fossil fuels contained in the formations; for displacing hydrocarbons (e.g., methane) from formation surfaces, such as in coal bed methane formations; for providing volumetric or pressurized displacement of the fossil fuels within a formation; and for commingling with the fossil fuel such that one or both of the density and viscosity of the fossil fuel is reduced. Still further, the $CO_2$ (alone or with water, preferably in the form of steam, or other materials) can be used to reduce the viscosity of the fossil fuel (e.g., heavy oils) directly by admixing with the fossil fuel or indirectly by heating the fossil fuel, or both.

The inventive methods and systems utilizing $CO_2$ for enhancing recovery of fuel material deposits can exhibit a variety of useful characteristics. For example, is some embodiments, the $CO_2$ used can be obtained as a byproduct (e.g., as a combustion product) from a power generation process (e.g., that combusts a fossil fuel). In certain embodiments, the $CO_2$ can be supplied from a power generation process at a pressure that is suitable for direct injection into a deposit formation, specifically a geological structure or rock formation. In other embodiments, the $CO_2$ can be supplied from a power generation process at a location that is suitable for direct injection into the deposit formation. More specifically, such direct deposit can mean that any $CO_2$ transmission pipeline associated with transmission of the $CO_2$ for injection would have a minimum to near zero length—e.g., less than about 10 miles, less than about 5 miles, less than about 1 mile, less than about 1,000 feet, or less than about 100 feet. In further embodiments, the invention can provide a transportable $CO_2$ generating system than can be installed at or near the point of use of the $CO_2$—e.g., in the same field with one or more wells or even directly within a well bore. In additional embodiments, the invention can provide a transportable $CO_2$ generating system than can be easily disassembled, relocated, and reassembled at one or more subsequent points of use of the $CO_2$ after use of the system at a first point. In still other embodiments, the invention can provide a transportable $CO_2$ generating system than can be connected to the point of use of the $CO_2$ without a pipeline or with a pipeline of minimum length, as otherwise described herein.

In various embodiments, the power generation process from which the $CO_2$ is derived can be at least partially fueled using a stream separated from a fuel material fraction recovered according a method of the invention. In certain embodiments, the separated stream (which may be a gas stream) can contain at least $CO_2$, and the separated stream can be used with no further process steps to remove hydrocarbon or contaminant components present before being optionally compressed and becoming at least part of the fuel feed to a power production process from which $CO_2$ is derived. In preferred embodiments, a power production process useful according to the invention can use $CO_2$ as a working fluid.

The invention generally encompasses a process that produces $CO_2$, and such process can be used likewise to produce electricity, which adds value. Optionally the process can be simplified substantially to a combustor only. In this case, the capital cost is extremely low. This case is optimum when the fuel cost is very low, as in locations where natural gas (NG) is flared, or when coal slurry is available as a low cost fuel.

In other embodiments, the combustor can be used for direct injection of $CO_2$ (and/or optionally water) into a reservoir suitable for recovery of deposits, such as fossil fuels. Any combination of fuel gas, oxygen, water, nitrogen, argon, air, and other additives may be added into a high pressure and high temperature combustor.

In one embodiment, the $CO_2$ (and/or water) as a result of combustion (above ground or down-hole) can be directed into a reservoir suitable for fossil fuel recovery. In another embodiment, the $CO_2$ (and/or water) can be directed through any combination of coolers, filters, and pumps before injection into a well for fossil fuel recovery. This embodiment may particularly be used only for the production of supercritical $CO_2$ to enhance recovery of fossil fuels from appropriate reservoirs. In these processes, carbon dioxide can be compressed to significant pressure—often in excess of 200 bar (20 MPa) to inject into underground formations that have lost the necessary pressure to facilitate flow of the fossil fuels, and other substances, to a well bore for removal. Carbon dioxide can act to re-pressure the underground formation and acts as a natural surfactant to swell and/or remove the oil and other fossil fuels from rock surfaces and pores. In the case of enhanced coal bed methane recovery (ECBMR) and other forms of natural gas recovery, coal beds and other underground structures are flooded or fractured with $CO_2$, again acting to either pressurize the well, break the rock to free the gas, or as a natural surfactant to remove the natural gas. In the case of coal bed methane, the $CO_2$ displaces $CH_4$ and various short chain hydrocarbon gases associated with (e.g., adsorbed on) the coal particle surfaces, and the $CO_2$ itself then becomes adsorbed on the coal, effectively sequestering the $CO_2$ in the formation.

In yet other embodiments, the combustor may be specifically located down-hole to generate steam and/or heat in enhanced recovery applications, such as EOR, particularly in formations where the API of the fuel material is below about 20 such as in tar sands. In a fuel material bearing formation, a water-quenched down-hole combustor can generate steam and heat to remove the fuel material. In one embodiment, as a pressurized stream containing the fuel material leaves the reservoir, the stream goes through an expander and into a reservoir where heavy oil is removed. The water and/or $CO_2$ is then directed through power production components to generate electricity, and $CO_2$ is produced to dilute the fuels going into the down-hole combustor.

The present invention is particularly beneficial in that a reliable, consistent, high purity source of $CO_2$ can be provided for use as a recovery fluid. Since the $CO_2$ produced from the power production process is directed to the recovery method, this beneficially prevents immediate release of the $CO_2$ to the atmosphere as the $CO_2$ rather can be sequestered in the fossil fuel reservoir (at least in part) after down-hole pumping for recovery purposes and/or will be recycled through the process one or more times. Moreover, the availability of a reliable, consistent, high purity source of $CO_2$ can replace the use of environmentally damaging materials as fracturing fluids since the $CO_2$ can be a readily available, cost-saving alternative to more toxic options.

In another embodiment, the $CO_2$ stream coming out of the down-hole combustor or high efficiency cycle can also be cooled with water to create a steam generator. The invention further provides the option to use water steam as a transpiration fluid.

More specifically, the present invention can be directed to methods for recovering a fuel material deposit from a formation. The method can comprise combusting a fuel to provide a $CO_2$ containing stream wherein at least a portion of the $CO_2$ is in a supercritical state. In other words, at least a portion of the stream can comprise supercritical $CO_2$. The method further can comprise injecting at least a portion of the $CO_2$ containing stream into the formation including the fuel material deposit for recovery such that at least a portion of the fuel material in the formation and at least a portion of the $CO_2$ stream flow from the formation and into a recovery well.

In more particular embodiments, noted method may take on a variety of characteristics. Non-limiting examples of the further embodiments are noted below.

The $CO_2$ containing stream may exhibit a pressure of at least 7.5 MPa when the $CO_2$ containing stream is injected into the formation.

The combusting step may be performed above-ground at a location that is a short distance (e.g., less than about 5 km) from the site where the $CO_2$ containing stream is injected into the formation.

Prior to being injected into the formation, the $CO_2$ containing stream may be expanded across a turbine for power generation.

The $CO_2$ containing stream from the combusting may be injected into the formation without any intervening compression, collection, or transport to the site where the $CO_2$ containing stream is directed into the formation. Similarly, the $CO_2$ containing stream may be directly injected into the formation without undergoing any intervening processing.

The $CO_2$ containing stream may be injected into the formation through an injection well. Further, the combusting step may be performed down-hole in the injection well.

The combusting step may particularly be carried out using a transpiration cooled combustor. More particularly, the method can comprise providing a fuel, an oxidant, and a transpiration fluid to the transpiration cooled combustor. Even more particularly, the method can comprise providing a working fluid to the combustor that is different from the transpiration fluid.

In certain embodiments, a method for recovering a fuel material deposit from a formation according to the invention may comprise the following steps: providing a combustion fuel and an oxidant into a transpiration cooled combustor; combusting the combustion fuel to provide a $CO_2$ containing stream comprising supercritical $CO_2$; and injecting at least a portion of the $CO_2$ containing stream into the formation including the fuel material deposit for recovery such that at least a portion of the fuel material in the formation and at least a portion of the $CO_2$ stream flow from the formation and into a recovery well.

In particular, combustion may be carried out above ground. Thus, the combustion fuel and oxidant can be provided into a transpiration cooled combustor positioned above ground.

After combusting and prior to injecting, the method can include expanding the $CO_2$ containing stream across a turbine for power generation to form an expanded $CO_2$ containing stream. The expanded $CO_2$ containing stream can be passed through a heat exchanger that cools the $CO_2$ containing stream and/or through one or more separators that removes one or more secondary components present in the $CO_2$ containing stream. Preferably, the cooling is carried out first and the separation follows sequentially thereafter.

Also prior to injecting, the $CO_2$ containing stream can be separated into an injection $CO_2$ stream that is injected into the formation and a recycle $CO_2$ stream that is provided into the transpiration cooled combustor as a working fluid. To this end, the method further can comprise one or more of compressing the recycle $CO_2$ stream by passing the stream through a compressor and heating the recycle $CO_2$ stream by passing the stream through the heat exchanger that cooled the expanded $CO_2$ containing stream. Accordingly, the method can then encompass providing the recycle $CO_2$ stream into the combustor as the working fluid. Preferably, the recycle $CO_2$ stream may be provided into the combustor at a pressure of at least about 2 MPa. In some embodiments, at least a portion of the recycle $CO_2$ stream is provided into the combustor as at least a portion of a transpiration fluid used to cool the transpiration cooled combustor. It also can be preferably for the recycle $CO_2$ stream to be provided into the combustor at a specific purity level—e.g., having a purity of at least 95% molar.

The pressure of the $CO_2$ containing stream can vary throughout the method. For example, the expanded $CO_2$ containing stream may have a pressure of at least about 1.5 MPa. Further, the $CO_2$ containing stream injected into the formation may have a pressure of at least about 7.5 MPa. Pressure may be relevant to the state of the $CO_2$. Specifically, it may be preferable for the $CO_2$ containing stream that is injected into the formation to comprise supercritical $CO_2$. Similarly, combusting may be carried out at a specific temperature range—e.g., at a temperature of at least about 400° C.

In particular embodiments, the combustion fuel and the oxidant may be provided into a transpiration cooled combustor that is positioned down-hole in a well that opens into a formation. In such embodiments, the invention also may comprise providing water into the transpiration cooled combustor such that the $CO_2$ containing stream further includes steam. Specifically, the water may be provided into the transpiration cooled combustor as a transpiration cooling fluid.

As noted previously, the inventive methods further can comprise receiving from the recovery well a recovery stream comprising the fuel material and the $CO_2$. Accordingly, the methods may comprise separating the recovery stream into a recovered gas stream and a recovered liquid stream. Specifically, the recovered gas stream may comprise methane and $CO_2$ (as well as, optionally, one or more of $C_2$ hydrocarbons, $C_3$ hydrocarbons, and $C_4$ hydrocarbons). The recovered liquid stream specifically may comprise petroleum (which particularly may be crude oil, but does not exclude gaseous and/or solid forms of petroleum). In some embodiments, the recovered liquid stream may comprise a fluidized solid fuel material.

In certain embodiments, the inventive methods may comprise directing at least a portion of the recovered gas stream to the combustor as at least a portion of the combustion fuel. To this end, separating can comprise directing the recovery stream through at least one pressure letdown stage at a defined pressure whereby one or more fuel material gas fractions are withdrawn and the remaining fraction of the recovery stream at the defined pressure comprises liquid fuel material. In particular embodiments, one or more of the fuel material gas fractions can comprise the $CO_2$. Also, the methods further can comprise directing a fuel material gas fraction comprising the $CO_2$ to the combustor as at least a portion of the combustion fuel. The methods also can comprise passing the fuel material gas fraction through a compressor that increases the pressure of the fuel material gas fraction prior to being introduced into the combustor. In specific embodiments, separating can result in a plurality of fuel material gas fractions, and each of the fractions may comprise $CO_2$. In such embodiments, two or more of the plurality of fuel material gas fractions comprising $CO_2$ can be combined and directed to the combustor as at least a portion of the combustion fuel. This further may comprise passing the fuel material gas fractions through a compressor that increases the pressure of the fuel material gas fractions prior to being introduced into the combustor. Such compressor specifically may be a multi-stage compressor. Preferably, the separation steps will substantially partition all of the $CO_2$ from the recovery stream into the one or more fuel material gas fractions. For example, the fuel material gas fractions comprising the $CO_2$ may include at least about 95% by mass of the total $CO_2$ present in the recovery stream.

If desired, the method further may comprise separating the recovered gas stream into a recovered hydrocarbon gas stream and a recovered non-hydrocarbon gas stream (e.g., separating at least a portion of the $CO_2$ from the fuel gas fractions). Although this is not necessary according to the invention, it may be desirable in specific embodiments and thus is encompassed by the inventive methods.

In further embodiments, the invention may be characterized as providing a method of producing a $CO_2$ containing stream down-hole in a well. In particular, the method may comprise the following steps: providing a combustion fuel and an oxidant into a transpiration cooled combustor positioned down-hole in a well that is in or around a formation including a fuel material deposit; providing a transpiration cooling fluid into the combustor; and combusting the fuel within the transpiration cooled combustor in the presence of the transpiration cooling fluid so as to provide a $CO_2$ containing stream from an outlet of the combustor at a pressure of at least about 7.5 MPa and a temperature of at least about 400° C. Preferably, at least a portion of the $CO_2$ containing stream comprises supercritical $CO_2$.

In particular embodiments, the invention can encompass utilizing a formed $CO_2$ containing stream as a means for expanding a previously formed well and/or forming a separate pathway through a formation. Specifically, the methods can comprise directing the $CO_2$ containing stream toward the formation such that the $CO_2$ containing stream provided from the outlet of the combustor bores into the formation and creates a pathway therein. The method also can comprise advancing the combustor through the formed pathway.

Preferably, at least a portion of any formed $CO_2$ containing stream can be injected into the formation including the fuel material deposit such that at least a portion of the fuel material in the formation and at least a portion of the $CO_2$ stream flow from the formation and into a recovery well. Thereafter, recovery steps can be carried out as already discussed above.

The invention also provides a variety of systems and apparatuses that can be useful for recovering deposits from formations. For example, in certain embodiments, the invention can be characterized as providing an apparatus for producing a $CO_2$ containing stream down-hole in a well. In particular, the apparatus can comprise a transpiration cooled combustor, a fuel supply in fluid connection with the combustor, an oxidant supply in fluid connection with the combustor, a transpiration coolant supply in fluid connection with the combustor, a chamber within the transpiration cooled combustor wherein combustion of the fuel occurs at a temperature of at least about 600° C. to produce the $CO_2$ containing stream; and an outlet on the combustor that delivers the $CO_2$ containing stream from the combustor and into the well. In particular embodiments, the outlet can comprise a conically shaped nozzle that concentrates the $CO_2$ containing stream delivered therefrom. In other words, the nozzle focuses the $CO_2$ containing stream into a narrowed stream in comparison to the combustor end of the outlet, the narrowed stream exhibiting increased energy.

In further embodiments, the invention can be characterized as providing a $CO_2$ generating system. Such system can be used for recovering a fuel material deposit from a formation. For example, such system can comprise the following components: a transpiration cooled combustor; a combustion fuel supply in fluid connection with the combustor; an oxidant supply in fluid connection with the combustor; a transpiration coolant supply in fluid connection with the combustor; a chamber within the transpiration cooled combustor configured for receiving and combusting the combustion fuel to provide a $CO_2$ containing stream comprising supercritical $CO_2$; an injection component that delivers the $CO_2$ containing stream into the formation including the fuel material deposit such that at least a portion of the fuel material in the formation and at least a portion of the $CO_2$ stream flow from the formation and into a recovery well as a recovery stream; and one or more processing components for processing the recovered fuel material and $CO_2$ in the recovery stream.

In particular embodiments, the one or more processing components can comprise an expander that reduces the pressure of the recovery stream. More specifically, the expander can comprise a power generation turbine. Further, the one or more processing components can comprise one or more separation unit. More specifically, the separation unit may be a unit that separates a gas stream from a liquid stream. The injection component can comprise a pipeline extending into a well formed in the formation.

In specific embodiments, one or more of the combustion fuel supply, the oxidant supply, and the transpiration coolant supply can comprise piping of sufficient dimensions to deliver the respective material down hole into a well formed in the formation. In other embodiments, the transpiration cooled combustor can be configured for use down hole in a well formed in the formation. Preferably, the system can be sufficiently modular in construction such that the system can be reconfigured between a transportation state and a $CO_2$ generating state. Such reconfiguration particularly can be carried out within a matter of hours, days, or weeks.

BRIEF DESCRIPTION OF THE DRAWINGS

In order to assist the understanding of embodiments of the invention, reference will now be made to the appended drawings, in which like reference numerals refer to like elements and which are not necessarily drawn to scale. The drawings are exemplary only, and should not be construed as limiting the invention.

DETAILED DESCRIPTION OF THE INVENTION

Figure 1:
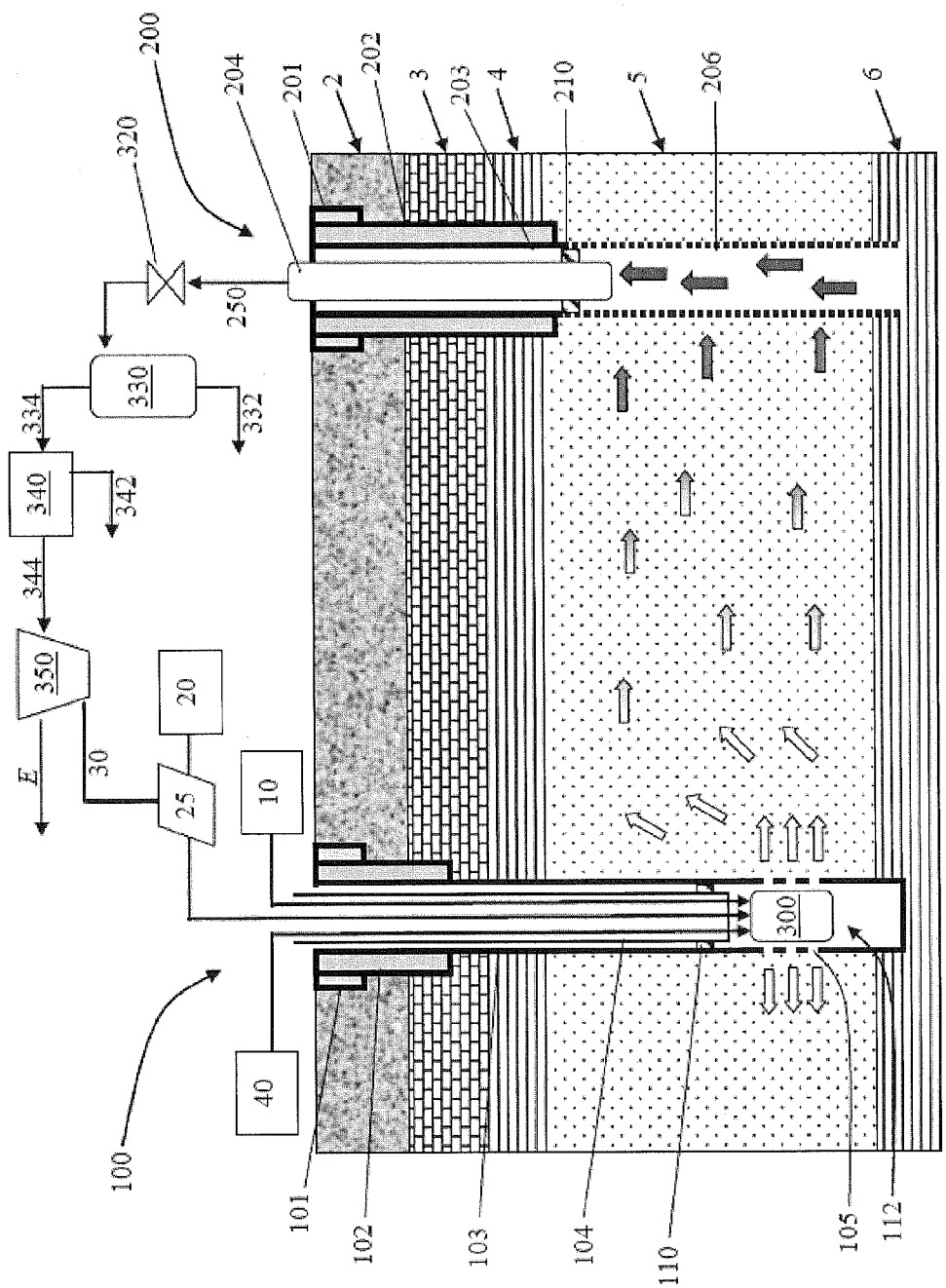
FIG. 1 provides a cross-section of a typical geological formation bearing oil as a deposit and illustrates a system and method of enhancing recovery of the oil in the formation through combustion of a fuel in a down-hole combustor located in an injection well according to an embodiment of the invention to produce $CO_2$ that is directed into the formation from the injection well to enhance recovery of the oil via a producing well with optional processing of the produced oil.

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention relates to systems and methods for providing a reliable, high purity source of $CO_2$ that can be safely and effectively provided for use in enhancing the recovery of a variety of formation deposits, particularly fuel material deposits. In specific embodiments, the terms "deposit" and "formation deposit" specifically can refer to fuel material deposits. As used herein, the term "fuel material" specifically can encompass any material that is recognized as providing energy, such as through combustion of the material, heat transfer, or other means whereby stored energy potential of the material is realized. A fuel material can encompass carbonaceous materials (including biomass, waste materials, and the like), which further can encompass solid, liquid, and gaseous hydrocarbons (including in a form consisting wholly of hydrogen and carbon and in a form that further includes additional elements or compounds—e.g., sulfur and oxygen—as part of the chemical structure of the hydrocarbon or as a physical mixture with the hydrocarbon). More specifically, a fuel material can be characterized as a fossil fuel, petroleum, crude oil, natural gas, coal, coke, bitumen, oil shale, tar sands, and/or combinations thereof, and/or derivatives thereof. Other aspects of geological formations that meet the criteria described above as may be recognizable to one of skill in the art with knowledge of the present invention may also be encompassed by the present invention.

In various embodiments, the present invention may be characterized as comprising injecting $CO_2$ or a $CO_2$ containing stream into a formation. In this sense, injecting or injection can include a passive transmission of the material into a formation. Since the very action of transporting a liquid or gaseous material into the face of a rock or otherwise porous formation typically requires applied pressure to significantly permeate the formation, injecting can be characterized as including application of a force, such as applied pressure. Since the combustor of the present invention can provide a combustion product stream at high pressure, the inherent pressure of the produced combustion product may be sufficient to achieve injection of the combustion product stream (or a portion thereof) into a formation. In other embodiments, however, additional pressurization may be used, particularly if the combustion product stream has been expanded in a power production method. Of course, additional expansion also may be used.

In certain embodiments, the $CO_2$ used in enhanced recovery of formation deposits can be yielded from a combustion method or cycle wherein a fuel is combusted to provide a combustion product stream comprising $CO_2$. The $CO_2$ can be withdrawn from a combustion product stream and thus may be obtained in various states of purity. Advantageously, through carrying out specific processing steps, the isolated $CO_2$ can be substantially completely pure. In some embodiments, however, the $CO_2$ can be used according to the invention as an integrated component of a combustion product stream. In other words, as more fully discussed below, although $CO_2$ arising from a combustion product stream can be purified to a defined degree prior to use, a $CO_2$ containing combustion product stream may be used in the invention without substantial purification or without any purification (i.e., direct injection of the combustion product stream, which may be characterized as the $CO_2$ containing stream). The combustion may or may not be a component of a larger system or method, such as a power production system or method. Thus, the $CO_2$ used according to the invention may be yielded from a power production system or method. The $CO_2$ (either as a purified stream or as a component of a combustion product stream) can be directed for use in a recovery method as discussed herein.

A system for providing $CO_2$ for use in an enhanced recovery method can comprise a combustor that is configured for $CO_2$ production through combustion of a fuel. An aspect of the combustion may be power production, and the provision of the $CO_2$ for enhanced recovery of deposits can occur after power production, before power product, or both after and before power production. In some embodiments, however, combustion may be carried out solely for $CO_2$ production for enhanced recovery of deposits. Accordingly, any system that combusts a carbonaceous fuel and produces $CO_2$ in quantities and forms described herein could be configured for use according to the present invention in light of the present disclosure.

Combustion as a means for yielding $CO_2$ can comprise the use of a high efficiency fuel combustor (such as a transpiration cooled combustor) and optionally a quenching fluid, which may function also as the transpiration fluid, a mixing fluid, and/or a circulating fluid. Specifically, the circulating fluid can be provided in the combustor along with an appropriate fuel, any necessary oxidant, and any associated materials that may be useful for efficient combustion and/or for further enhancing recovery of the deposits. In certain embodiments, the invention can comprise the use of a combustor that operates at very high temperatures (e.g., in the range of about 1,600° C. to about 3,300° C., or other temperature ranges as disclosed herein), and the circulating fluid can be useful to moderate the temperature of a combustion product stream exiting the combustor, if desired. Exemplary combustors useful according to the invention are disclosed in U.S. Publication No. 2011/0083435 and U.S. Publication No. 2010/0300063, the disclosures of which are incorporated herein by reference in their entireties.

In some embodiment, combustion may be carried out under conditions such that the $CO_2$ in the resultant combustion product stream is in a supercritical state. High temperature combustion can be particularly useful for providing a $CO_2$ stream for use in enhanced recovery methods in light of the ability to achieve substantially complete combustion of the fuel, maximize efficiency, and prevent production of a substantial content of particulate matter or matter in other solid forms. In various embodiments, high temperature combustion can mean combustion at a temperature of at least about 400° C., at least about 600° C., at least about 800° C., at least about 1,000° C., at least about 1,200° C., at least about 1,300° C., at least about 1,400° C., at least about 1,500° C., at least about 1,600° C., at least about 1,750° C., at least about 2,000° C., at least about 2,500° C., or at least about 3,000° C. In further embodiments, high temperature combustion can mean combustion at a temperature of about 1,200° C. to about 5,000° C., about 1,500° C. to about 4,000° C., about 1,600° C. to about 3,500° C., about 1,700° C. to about 3,200° C., about 1,800° C. to about 3,100° C., about 1,900° C. to about 3,000° C., or about 2,000° C. to about 3,000° C.

The use of transpiration cooling according to the present invention can be particularly useful to prevent corrosion, fouling, and erosion in the combustor. This further allows the combustor to work in a sufficiently high temperature range to afford complete or at least substantially complete combustion of the fuel that is used.

By way of example, a transpiration cooled combustor useful according to the invention can include a combustion chamber at least partially defined by a transpiration member, wherein the transpiration member is at least partially surrounded by a pressure containment member. The combustion chamber can have an inlet portion and an opposing outlet portion. The inlet portion of the combustion chamber can be configured to receive the fuel to be combusted within the combustion chamber at a combustion temperature to form a combustion product. The combustion chamber can be further configured to direct the combustion product toward the outlet portion. The transpiration member can be configured to direct a transpiration substance therethrough toward the combustion chamber for buffering interaction between the combustion product and the transpiration member. In addition, the transpiration substance may be introduced into the combustion chamber to achieve a desired outlet temperature of the combustion product. In particular embodiments, the transpiration substance can at least partially comprise the circulating fluid. The walls of the combustion chamber may be lined with a layer of porous material through which is directed and flows the transpiration substance, such as $CO_2$ and/or $H_2O$. The perforated/porous nature of the transpiration cooled combustor may extend substantially completely (axially) from the inlet to the outlet such that the transpiration fluid is directed into substantially the entire length of the combustion chamber. In other words, substantially the entire length of the combustion chamber may be transpiration-cooled. In other combustors, the perforations/pores may be spaced apart at an appropriate density such that substantially uniform distribution of the transpiration substance is achieved (i.e., no "dead spots" where the flow or presence of the transpiration substance is lacking). The ratio of pore area to total wall area (% porosity) may be, for example, at least about 5%, at least about 10%, at least about 15%, at least about 20%, at least about 30%, at least about 40%, or at least about 50%. Array sizes of about 10×10 to about 10,000×10,000 per inch with porosity percentages of about 10% to about 80% can be utilized in some examples.

An exemplary combustor can comprise a combustion chamber defined by a transpiration member, which may be at least partially surrounded by a pressure containment member. In some instances, the pressure containment member may further be at least partially surrounded by a heat transfer jacket, wherein the heat transfer jacket can cooperate with the pressure containment member to define one or more channels therebetween, through which a low pressure water stream may be circulated. Through an evaporation mechanism, the circulated water may thus be used to control and/or maintain a selected temperature of the pressure containment member, for example, in a range of about 100° C. to about 250° C. In some aspects, an insulation layer may be disposed between the transpiration member and the pressure containment member.

In some instances, the transpiration member may comprise, for example, an outer transpiration member and an inner transpiration member, the inner transpiration member being disposed opposite the outer transpiration member from the pressure containment member, and defining the combustion chamber. The outer transpiration member may be comprised of any suitable high temperature-resistant material such as, for example, steel and steel alloys, including stainless steel and nickel alloys. In some instances, the outer transpiration member may be configured to define first transpiration fluid supply passages extending therethrough from the surface thereof adjacent to the insulation layer to the surface thereof adjacent to the inner transpiration member. The first transpiration fluid supply passages may, in some instances, correspond to second transpiration fluid supply passages defined by the pressure containment member, the heat transfer jacket and/or the insulation layer. The first and second transpiration fluid supply passages may thus be configured to cooperate to direct a transpiration fluid therethrough to the inner transpiration member.

The inner transpiration member may be comprised of, for example, a porous ceramic material, a perforated material, a laminate material, a porous mat comprised of fibers randomly orientated in two dimensions and ordered in the third dimension, or any other suitable material or combinations thereof exhibiting the characteristics required thereof as disclosed herein, namely multiple flow passages or pores or other suitable openings for receiving and directing the transpiration fluid through the inner transpiration member. Non-limiting examples of porous ceramic and other materials suitable for such transpiration-cooling systems include aluminum oxide, zirconium oxide, transformation-toughened zirconium, copper, molybdenum, tungsten, copper-infiltrated tungsten, tungsten-coated molybdenum, tungsten-coated copper, various high temperature nickel alloys, and rhenium-sheathed or coated materials. Sources of suitable materials include, for example CoorsTek, Inc., (Golden, Colo.) (zirconium); UltraMet Advanced Materials Solutions (Pacoima, Calif.) (refractory metal coatings); Orsam Sylvania (Danvers, Mass.) (tungsten/copper); and MarkeTech International, Inc. (Port Townsend, Wash.) (tungsten). Examples of perforated materials suitable for such transpiration-cooling systems include all of the above materials and suppliers (where the perforated end structures may be obtained, for example, by perforating an initially nonporous structure using methods known in the manufacturing art). Examples of suitable laminate materials include all of the above materials and suppliers (where the laminate end structures may be obtained, for example, by laminating nonporous or partially porous structures in such a manner as to achieve the desired end porosity using methods known in the manufacturing art).

The transpiration substance may be directed through the inner transpiration member such that the transpiration substance forms a buffer layer (i.e., a "vapor wall") immediately adjacent to the inner transpiration member within the combustion chamber. In some instances, the transpiration fluid can be delivered at least at the pressure within the combustion chamber such that the flow rate of the transpiration fluid into the combustion chamber is sufficient for the transpiration fluid to mix with and cool the combustion products to form an exit fluid mixture at a desired temperature (e.g., as low as about 100° C. in some embodiments to as great as about 2,000° C. in other embodiments).

A combustor apparatus useful according to the invention may comprise various ancillary components, such as components useful for providing various materials used in the combustion process. For example, the combustor may include an integrated mixing chamber wherein fuel, circulating fluid (e.g., $CO_2$ and/or water), oxidant, and any further materials necessary to carry out combustion may be combined in any combination. Alternately, such materials may be mixed external to the combustor and input to the combustor in a substantially mixed state. In various embodiments, the combustor may include inputs for fuel, oxidant (e.g., $O_2$ or air), circulating fluid, and transpiration fluid. In specific embodiments, the circulating fluid and the transpiration fluid may be the same material or mixtures of materials. An air separation or compression unit may be used to provide the oxidant (e.g., in a substantially purified state), and a fuel injector device may be provided for receiving the oxidant and combining it with a $CO_2$ circulating fluid and a fuel stream, which can comprise a gas, a liquid, a supercritical fluid, or a solid particulate fuel slurried in a high density $CO_2$ fluid.

In another aspect, a transpiration-cooled combustor apparatus may include a fuel injector for injecting a pressurized fuel stream into the combustion chamber of the combustor apparatus, optionally in combination with the circulating fluid and/or the oxidant. The oxidant (optionally enriched oxygen) and the $CO_2$ circulating fluid can be combined as a homogeneous supercritical mixture.

In particular embodiments, a combustor according to the invention can take on a particular configuration that can facilitate specific uses, such as down-hole combustion. For example, in some embodiments, it may be useful for the combustor to provide a focused product stream that is effective for partially or completely dissolving at least the portion of the formation that is incident to the portion of the combustor from which the combustion product stream flows. Specifically, the combustor may include a nozzle or similarly conically shaped segment that concentrates the combustion products into a high pressure, high temperature stream upon exiting the combustor. In such configurations, a down-hole combustor according to the present invention may at least partially create a bore hole in the formation through which the combustor may proceed to inject supercritical $CO_2$ into the surrounding formation.

Additionally, the combustor may include an outer shell (e.g., a metal or ceramic material) in addition to the transpiration cooled configurations already described above. Such external shell may provide structural protection against physical damage to the combustor (e.g., from unintentional contact with rock formations) and can further protect against growth of organic materials or deposition of other contaminants from rock, soot, and other materials that may be dislodged by the down-hole combustion stream. In particular embodiments, the outer shell may also be transpiration protected (which may be at a lower temperature than transpiration of the main combustor wall). Such additional transpiration protection may be useful to protect and/or lubricate the down-bore device to facilitate passage through the formations.

A wide variety of materials may be used as a fuel in the combustor. For example, combustion to produce $CO_2$ for enhanced recovery of formation deposits may be carried out using any of the following: various grades, types, and derivatives of coal, wood, oil, fuel oil, natural gas, coal-based fuel gas, tar from tar sands, bitumen, and the like. Even further materials that may used as the fuel can include biomass, algae, graded combustible solid waste refuse, asphalt, used tires, diesel, gasoline, jet fuel (JP-5, JP-4), gases derived from the gasification or pyrolysis of hydro-carbonaceous material, ethanol, solid and liquid biofuels, and the like. In embodiments wherein the formation deposits for recovery include a fossil fuel, it can be particularly beneficial for the fuel used in the combustor to be a component of the recovery stream returned from the formation deposit (e.g., natural gas, oil, or an oil fraction recovered from a formation). Any of the above combustion fuels may be characterized as a carbonaceous fuel to the extent that the material includes a carbon component.

The fuels can be processed in various manners prior to injection into the combustion apparatus and can be injected at desired rates and pressures useful to achieve a desired combustion product stream. Such fuels may be in liquid, slurry, gel, or paste form with appropriate fluidity and viscosity at ambient temperatures or at elevated temperatures. For example, the fuel may be provided at a temperature of about 30° C. to about 500° C., about 40° C. to about 450° C., about 50° C. to about 425° C., or about 75° C. to about 400° C. Any solid fuel materials may be ground or shredded or otherwise processed to reduce particles sizes, as appropriate. A fluidization or slurrying medium can be added, as necessary, to achieve a suitable form (e.g., a coal slurry) and to meet flow requirements for high pressure pumping. Of course, a fluidization medium may not be needed depending upon the form of the fuel (i.e., liquid or gas). Likewise, the circulated circulating fluid may be used as the fluidization medium, in some embodiments.

Combustion as a means for production of $CO_2$ for enhanced recovery of formation deposits can be carried out making use of specific process parameters and components. Examples of high efficiency combustion systems and methods that may be used according to the present invention to yield $CO_2$ are described in U.S. Patent Publication No. 2011/0179799, the disclosure of which is incorporated herein by reference in its entirety. Preferably, the combustion system requires no additional compression or removal of impurities before injection into pipelines or formations for enhancing recovery of deposits, such as fossil fuels. The present invention can also be applied to other combustion processes that can accept a feed fuel stream containing a substantial quantity of $CO_2$.

In various embodiments of the invention, the combustor apparatus used in the enhanced recovery methods can be at a surface location that is in proximity to the site for injection of the produced $CO_2$. A surface-located combustor can be in a permanent, semi-permanent, or transportable state. For example, the combustor can be a component of a power production system wherein a fuel is combusted (preferably at high temperature) in the presence of a circulating fluid (particularly $CO_2$) or other quenching fluid that can moderate the temperature of the combustion product stream exiting the combustor so that the combustion product stream can be utilized in energy transfer for power production. Specifically, the combustion product stream can be expanded across at least one turbine to generate power. The expanded gas stream can be subjected to processing, as further described below, or can be injected directly into the formation.

In various embodiments, it can be desirable for the $CO_2$ to be introduced into the combustor at a defined pressure and/or temperature. Specifically, it can be beneficial for the $CO_2$ introduced into the combustor to have a pressure of at least about 2 MPa, at least about 5 MPa, at least about 8 MPa, at least about 10 MPa, at least about 12 MPa, at least about 15 MPa, at least about 18 MPa, or at least about 20 MPa. In other embodiments, the pressure can be about 2 MPa to about 50 MPa, about 5 MPa to about 40 MPa, or about 10 MPa to about 30 MPa. Further, it can be beneficial for the $CO_2$ introduced into the combustor to have a temperature of at least about 200° C., at least about 250° C., at least about 300° C., at least about 400° C., at least about 500° C., at least about 600° C., at least about 700° C., at least about 800° C., or at least about 900° C.

In some embodiments, it can be useful for the $O_2$ supplied to the combustor to be substantially purified (i.e., upgraded in terms of the molar content of $O_2$ in relation to other components naturally present in air). In certain embodiments, the $O_2$ can have a purity of greater than about 50% molar, greater than about 75% molar, greater than about 85% molar, greater than about 90% molar, greater than about 95% molar, greater than about 98% molar, or greater than about 99% molar. In other embodiments, the $O_2$ can have a molar purity of about 85% to about 99.6% molar, about 85% to about 99% molar, or about 90% to about 98% molar. Overall $CO_2$ recovery from the carbon in the fuel favors the use of higher purities in the range of at least about 99.5% molar.

In certain embodiments, the amount of $O_2$ provided can be in excess of the noted stoichiometric amount by at least about 0.1% molar, at least about 0.25% molar, at least about 0.5% molar, at least about 1% molar, at least about 2% molar, at least about 3% molar, at least about 4% molar, or at least about 5% molar. In other embodiments, the amount of $O_2$ provided can be in excess of the noted stoichiometric amount by about 0.1% to about 5% molar, about 0.25% to about 4% molar, or about 0.5% to about 3% molar.

The introduction of the circulating fluid and/or the transpiration fluid into the combustor can be useful to control combustion temperature such that the combustion product stream leaving the combustor has a desired temperature. For example, it can be useful for the combustion product stream exiting the combustor to have a temperature of at least about 500° C., at least about 750° C., at least about 900° C., at least about 1,000° C., at least about 1,200° C., or at least about 1,500° C. In some embodiments, the combustion product stream may have a temperature of about 100° C. to about 2,000° C., about 150° C. to about 1,800° C., about 200° C. to about 1,600° C., about 200° C. to about 1,400° C., about 200° C. to about 1,200° C., or about 200° C. to about 1,000° C.

The combustion product stream can be directed to a turbine wherein the combustion product stream is expanded to generate power (e.g., via a generator to produce electricity). The turbine can have an inlet for receiving the combustion product stream and an outlet for release of a turbine discharge stream comprising $CO_2$. A single turbine may be used in some embodiments, or more than one turbine may be used, the multiple turbines being connected in series or optionally separated by one or more further components, such as a further combustion component, a compressing component, a separator component, or the like. A stream originating from a combustion process as discussed herein and entering and/or exiting any of these components may be described as being a $CO_2$ containing stream and may arise from one or more combustors.

The temperature of the stream at the turbine inlet can vary, such as to as high as about 1,350° C. In other embodiments, the present systems and methods can use a turbine inlet temperature in a much lower range, as described above. Moreover, the combustion product stream leaving the combustor can have a pressure that is closely aligned to the pressure of the $CO_2$ circulating fluid entering the combustor. In specific embodiments, the combustion product stream can be at a temperature and pressure such that the $CO_2$ present in the stream is in a supercritical fluid state. When the combustion product stream is expanded across the turbine, the pressure of the stream can be reduced. Such pressure drop can be controlled such that the pressure of the combustion product stream is in a defined ratio with the pressure of the turbine discharge stream e.g., a ratio of less than about 12, less than about 10, less than about 8, or less than about 7. In other embodiments, the inlet pressure to outlet pressure ratio a the turbine can be about 1.5 to about 12, about 2 to about 10, about 3 to about 9, or about 4 to about 8.

In specific embodiments, it can be desirable for the turbine discharge stream to be under conditions such that the $CO_2$ in the stream is no longer in a supercritical fluid state but is rather in a gaseous state. For example, providing the $CO_2$ in a gaseous state can facilitate further processing of the stream prior to injection in to the formation. Thus, the turbine discharge stream may have a pressure that is below the pressure where the $CO_2$ would be in a supercritical state—i.e., less than about 7.3 MPa, is less than about 7 MPa, less than about 6 MPa, less than about 5 MPa, less than about 4 MPa, less than about 3 MPa, less than about 2 MPa, or less than about 1.5 MPa. In other embodiments, the pressure of the turbine discharge stream can be about 1.5 MPa to about 7 MPa, about 3 MPa to about 7 MPa, or about 4 MPa to about 7 MPa. In specific embodiments, the pressure of the turbine discharge stream can be less than the $CO_2$ condensing pressure at the cooling temperatures to be encountered by the stream (e.g., ambient cooling). In other embodiments, however, where cooling and/or separation may not be required or desired, it can be useful for the pressure of the turbine discharge stream to be greater. For example, the pressure may be at least about 7.5 MPa, at least about 8 MPa, at least about 8.5 MPa, at least about 9 MPa, or at least about 10 MPa. In still other embodiments, the pressure of the turbine discharge stream can be at least about 1.5 MPa, at least about 2 MPa, at least about 3 MPa, at least about 4 MPa, or at least about 5 MPa.

Although passage of the combustion product stream through the turbine may lead to some amount of temperature decrease, the turbine discharge stream may be significantly similar to the temperature of the combustion product stream. For example, the turbine discharge stream may have a temperature of about 500° C. to about 1,000° C., about 600° C. to about 1,000° C., about 700° C. to about 1,000° C., or about 800° C. to about 1,000° C. Because of the relatively high temperature of the combustion product stream, it can be beneficial for the turbine to be formed of materials capable of withstanding such temperatures. It also may be useful for the turbine to comprise a material that provides good chemical resistance to the type of secondary materials that may be present in the combustion product stream.

The combustion product stream (or the turbine discharge stream in energy production embodiments) may be in a condition for direct injection into the formation where enhanced recovery of a deposit is desired (meaning without the necessity for further processing of the stream, such as to remove impurities, etc.). In some embodiments, it may be desirable, however, to further process the stream prior to injection. For example, where the $CO_2$ stream is being injected into a well, a pipeline, or a formation generally that may be damaged by sufficiently high pressure injection, the $CO_2$ from the combustion process may be pressure modified. As noted above, expansion in power production may reduce the $CO_2$ stream pressure; however, even further pressure reduction may be desired, and such pressure reduction can be provided by passage through one or more further power production turbines. Other means for pressure reduction also may be used as would be recognized by one of skill in the art with the advantage of the present disclosure. Preferably, compression of the $CO_2$ stream will not be required in light of the possible energy input required. Nevertheless, if useful, such as because of the specific geology of the formation structure or pipeline specifications, compression of the $CO_2$ may be carried out.

In some embodiments, it may be useful to adjust the temperature of the $CO_2$ stream prior to injection into the formation. As further discussed below, use of a stream of relatively high temperature may be useful, such as in enhanced recovery of heavy oil. Since the present invention encompasses high temperature combustion systems and methods, however, it may be useful in some embodiments to cool the $CO_2$ stream prior to injection.

In particular, it can be useful to pass the $CO_2$ stream through at least one heat exchanger that cools the stream and provides a $CO_2$ stream having a temperature in a defined range. In specific embodiments, the cooled $CO_2$ can have a temperature of less than about 1,000° C., less than about 750° C., less than about 500° C., less than about 250° C., less than about 100° C., less than about 80° C., less than about 60° C., or less than about 40° C. In certain embodiments, it can be particularly useful for the heat exchanger to comprise at least two heat exchangers in series for receiving the $CO_2$ stream and cool it to a desired temperature. The type of heat exchanger used can vary depending upon the conditions of the stream entering the heat exchanger. For example, since the $CO_2$ stream may be at a relatively high temperature, it may thus be useful for the heat exchanger directly receiving the $CO_2$ stream to be formed from high performance materials designed to withstand extreme conditions (e.g., an INCONEL® alloy or similar material). The first heat exchanger in a series can comprise a material capable of withstanding a consistent working temperature of at least about 400° C., at least about 600° C., at least about 800° C., or at least about 1,000° C. It also may be useful for one or more of the heat exchangers to comprise a material that provides good chemical resistance to the type of secondary materials that may be present in the combustion product stream. Suitable heat exchangers can include those available under the tradename HEATRIC® (available from Meggitt USA, Houston, Tex.). In embodiments where the first heat exchanger in a series can transfer a sufficient content of heat from the $CO_2$ stream, one or more further heat exchangers present in the series can be formed of more conventional materials—e.g., stainless steel. In specific embodiments, at least two heat exchangers or at least three heat exchangers are used in a series to cool the turbine discharge stream to the desired temperature.

In some embodiments, it may be desirable for the $CO_2$ stream from the combustion method to undergo further processing to separate out any secondary components remaining in the $CO_2$ stream. Such secondary components may or may not be present, particularly depending upon the nature of the fuel used in the combustion method. Likewise, it may or may not be desirable to separate any secondary components present in the $CO_2$ stream depending upon the formation into which it is being injected. Accordingly, the present methods and system may comprise the use of one or more separation units.

In particular embodiments, it may be useful to remove some or all of any water present in the $CO_2$ stream. Although it may be useful for a "wet" $CO_2$ stream to be input directly into a formation for enhanced recovery of certain deposits, including in relation to certain fossil fuels, if otherwise necessary, water present in the $CO_2$ stream (e.g., water formed during combustion of a carbonaceous fuel and persisting through any further processing prior to injection) can be removed mostly as a liquid phase from a cooled $CO_2$ stream. Such separation may be achieved by providing the $CO_2$ stream (e.g., in a gaseous state) at a pressure that is less than the point at which $CO_2$ present in the gas mixture is liquefied when the gas mixture is cooled to the lowest temperature achieved with ambient temperature cooling means. For example, the $CO_2$ stream can be provided at a pressure of less than 7.38 MPa during separation of secondary components therefrom. An even lower pressure may be required if cooling means at a temperature in the low ambient range or substantially less than ambient are used. This allows for separation of water as a liquid. In some embodiments, the pressure may be substantially the same as the pressure at the turbine outlet. A "dry" $CO_2$ stream after water separation may comprise water vapor in an amount of less than 1.5% on a molar basis, less than 1% on a molar basis, or less than 0.5% on a molar basis. If desired, further drying may be applied such that the $CO_2$ stream is completely or substantially free of water. For example, low concentrations of water may be removed by desiccant dryers or other means that would suitable in light of the present disclosure.

Further secondary components that may be removed from the $CO_2$ stream include, for example, $SO_2$, $SO_3$, HCl, NO, $NO_2$, Hg, $O_2$, $N_2$, and Ar. These secondary components of the $CO_2$ stream can all be removed from a cooled $CO_2$ stream using appropriate methods, such as methods defined in U.S. Patent Application Publication No. 2008/0226515 and European Patent Application Nos. EP1952874 and EP1953486, all of which are incorporated herein by reference in their entirety. In specific embodiments, various secondary components may be removed via the following methods: $SO_2$ and $SO_3$ can be converted 100% to sulfuric acid; >95% of NO and $NO_2$ can be converted to nitric acid; excess $O_2$ can be separated as an enriched stream for optional recycle to the combustor; and inert gases (e.g., $N_2$ and Ar) can be vented at low pressure to the atmosphere.

In embodiments wherein the combustion product stream is cooled to facilitate removal of one or more components thereof, it may be useful to re-heat the stream prior to injection into the formation. As described above, one or more heat exchangers may be used to cool the combustion product stream. If desired, the $CO_2$ containing stream may be passed back through the same heat exchanger(s) to capture the heat previously withdrawn from the combustion product stream.

If desired, the $CO_2$ stream may be provided for injection or recycle back into the combustor as a circulating fluid in a substantially purified form. Specifically, a purified $CO_2$ stream for can have a $CO_2$ concentration of at least about 95% molar, at least about 97% molar, at least about 98.5% molar, at least about 99% molar, at least about 99.5% molar, or at least about 99.8% molar. Moreover, the $CO_2$ containing stream can be provided at a desired pressure for injection into a formation, input into a pipeline, and/or input into the combustor. It can be particularly useful for the $CO_2$ containing stream to have an injection pressure (i.e., the pressure of the $CO_2$ containing stream at the point of injection into the formation—such as leaving the well bore and entering the formation) that is at a minimum level. For example, the $CO_2$ containing stream can have an injection pressure of at least about 1.5 MPa, at least about 2 MPa, at least about 3 MPa, at least about 4 MPa, at least about 5 MPa, at least about 6 MPa, at least about 7 MPa, at least about 7.5 MPa, at least about 8 MPa, at least about 9 MPa, at least about 10 MPa, at least about 11 MPa, or at least about 12 MPa. In other embodiments, the $CO_2$ containing stream can have pressure from ambient to about 30 MPa. Such pressures likewise can apply to any portion of the $CO_2$ stream that is recycled back into the combustor and/or is input into a pipeline.

In certain embodiments, the $CO_2$ containing stream may be characterized in relation to its viscosity and/or density. Preferably, the $CO_2$ containing stream will have an injection pressure that is near or above the minimum miscibility pressure (MMP) of the formation (and its fuel material deposit). Accordingly, the density and viscosity of a $CO_2$ containing stream according to the invention can be a function of the MMP of the specific well, which can be a known value. For example, it has been shown in North Sea reservoirs that $CO_2$ used in EOR must have a density of 570 kg/m$^3$ to 800 kg/m$^3$ and a viscosity of 0.04 mPa s to 0.07 mPa s. If desired, the invention can encompass the use of additives to alter the density and/or viscosity of the $CO_2$ containing stream.

In preferred embodiments, a $CO_2$ stream yielded from a combustion system or method can be injected into a deposit formation without the necessity of separation of any non-$CO_2$ components and/or compression of the $CO_2$ stream. Accordingly, in embodiments related to surface combustion, the $CO_2$ stream may be injected in a formation after combustion only, after combustion and expansion for power generation, after combustion and cooling, or after combustion, expansion, and cooling. Preferably, in embodiments related to surface combustion, at least one expansion step is included to as to provide for power production, particularly in embodiments where some level of pressure reduction is useful prior to injection into the formation.

In some embodiments, direct injection of the $CO_2$ stream into a formation may be particularly desirable. Direct injection may be characterized as injection of the $CO_2$ containing combustion product stream into the formation without any further intermediate steps as otherwise described herein (e.g., without expansion, cooling, or separating components from the stream). Direct injection can include transporting the $CO_2$ stream from the combustor to a separate pipeline that delivers the $CO_2$ stream to an injection site or from the combustor through a pipeline that is a dedicated component of the system and method. Delivery to a wellhead component for injection through existing oil well components, natural gas well components, or the like also can be considered direct injection of the $CO_2$ stream according to the invention.

It can be particularly beneficial for a power production facility as described above that produces $CO_2$ for enhanced formation deposit recovery to be located substantially near the formation where the $CO_2$ will be injected. Such proximity can reduce or eliminate the need for excess transfer of the $CO_2$. For example, in embodiments wherein the formation deposit for recovery is a fossil fuel, it can be beneficial for the power production facility to be located in or near the field including the well or wells from which the fossil fuel is being recovered. Preferably, the power production facility can be located very near the site where the $CO_2$ will be injected to enhance recovery of the fossil fuel. In this manner, use of pipelines, tanker trucks, and the like may be reduced or completely eliminated. In particular, the present $CO_2$ production system may include sections of pipeline that are in fluid connection with the remaining components of the combustion system such that $CO_2$ produced by combustion is directed specifically to the injection well through the pipeline without connects that allow input of $CO_2$ from a source that is external to the inventive system.

In some embodiments, the power production can be sufficiently near the site where the produced $CO_2$ is injected such that any pipeline that was used to direct the produced $CO_2$ to the injection site has a total length of less than about 50 km, less than about 40 km, less than about 30 km, less than about 20 km, less than about 10 km, less than about 5 km, less than about 2 km, less than about 1 km, less than about 0.5 km, less than about 0.25 km, or less than about 0.1 km. In some embodiments, any transmission pipeline associated with transmission of the $CO_2$ from the power production facility to the injection site can be described as having a near zero length. This particularly can mean pipelines having a total length of less than about 0.5 km, less than about 0.25 km, or less than about 0.1 km. Such distances can be considered a "near zero" distance according to the present invention since $CO_2$ transmission pipelines typically have a length measured in the hundreds of kilometers. Thus, by comparison, the values noted above can be considered to be relatively near zero. Moreover, the ability to provide the $CO_2$ production facility in such proximity to the injection site is not a matter of mere optimization that could be achieved without real effort. Rather, known $CO_2$ sources typically are not amenable to construction at specific sites at specific distances from where an injection site may be located. This limitation is why the art typically has required great lengths of pipelines and/or other means for transporting $CO_2$ the great distances necessary to reach a fossil fuel deposit where enhanced recovery methods are needed.

This advantage of the present invention is particularly realized by the ability to provide a $CO_2$ production system that is fully transportable due to, but not limited to, its small size and modular design. A fully transportable system according to the present invention can be a surface production facility or down-hole combustion system that is formed of components that can be assembled to form an operable facility in a relatively short time and, whenever desired, can be disassembled in a relatively short time such that the full complement of components can be transported to a different location (e.g., by truck, rail, or other suitable vehicle) and again assembled in a relatively short time. Thus, the system or apparatus may be described as being modular in nature so as to allow the system to be reconfigured from a transportation mode to a operation mode. As used in relation to these embodiments, a relatively short time can be defined to mean a total assembly time from separate components to operable facility (i.e., producing $CO_2$) or a total time of reconfiguration of less than 56 days, less than 49 days, less than 42 days, less than 35 days, less than 28 days, less than 21 days, less than 14 days, less than 10 days, less than 7 days, less than 5 days, or less than 2 days. Like time periods can apply to the disassembly from an operable facility to the separate components. Such transportable system may include power production components as described herein or may be limited substantially to the combustor and associated components necessary for $CO_2$ production. Moreover, such transportable system may be sufficiently compact such as to be skid-mounted. In this manner, the $CO_2$ production system may be transported to a specific injection well and attached substantially directly to the well-head for direct injection of produced $CO_2$ into the well. The $CO_2$ producing process thus is compact and can be constructed in a form for disassembly, transportation to a new recovery site, and reassembly at the lowest possible cost. This likewise can function to eliminate the cost of a $CO_2$ pipeline.

In addition to surface combustion, such as described above, the present invention also encompasses embodiments wherein combustion is carried out at a sub-surface location. By the term "sub-surface" is meant that the actual combustion of the fuel to produce $CO_2$ is carried out at a physical location that is below ground level. In some embodiments, the combustor may be located only a few meters below ground level. In other embodiments, the combustor may be located up to about 10 m, up to about 100 m, up to about 500 m, up to about 1,000 m, up to about 1,500 m, up to about 2,000 m, up to about 5,000 m, or up to about 10,000 m below ground level. In further embodiments, the combustor may be located at least about 1 m, at least about 10 m, at least about 25 m, at least about 50 m, at least about 100 m, at least about 250 m, at least about 500 m, or at least about 1,000 m below ground level. In even other embodiments, the combustor can be located about 1 m to about 5,000 m, about 5 m to about 4,000 m, about 10 m to about 3,000 m, or about 25 m to about 2,000 m below ground level. According to this aspect of the invention, the combustor may be characterized as being located down-hole (particularly in relation to fossil fuel formations or other formations where a well may be bored to recover the deposit), as being located within the formation from which enhanced recovery is desired, as being located above the deposit for which enhanced recovery is desired, as being located below the deposit for which enhanced recovery is desired, or as being located aside the deposit for which enhanced recovery is desired (i.e., in a common horizontal plane with the deposit).

When down-hole combustion is used, it can be particularly beneficial to completely eliminate the pre-injection power production system wherein a working fluid is used, such as to generate electricity. In this manner, the methods and systems of the invention can be effectively condensed into as little as a combustor and any piping necessary to deliver combustion materials (and any additionally desired enhanced recovery component—e.g., water for steam generation) down-hole to the input end of the combustor. Thus, combustion can be carried out to produce $CO_2$ (and optionally steam or other products useful for enhancing recovery of certain deposits), which directly passes from the output end of the combustor into the formation to enhance recovery of the particular deposits, such as further described herein. As discussed in greater detail below, the produced $CO_2$ may be combined with the deposit that is recovered from the formation in the recovery stream. If desired, the produced $CO_2$ specifically, or part or all of the recovery stream, may be used to generate power in much the same manner described above. In these embodiments, the power production components of the systems and methods may be physically separated from the combustor (i.e., the combustor being located down-hole and the power production turbine(s) and similar or additional components being located above-ground). Even in such embodiments, however, the combustor and the power production components can be described as being in fluid communication. Specifically, the combustion product stream exiting the output end of the combustor passes into the formation, mixes with or otherwise facilitates recovery of the deposit, and is included in the recovery stream from the formation that may be passed directly through the power production components or separated into one or more portions prior to being passed through the power productions components.

Whether surface combustion or down-hole combustion is employed, the present invention can relate to enhanced recovery of a variety of materials. In specific embodiments, the inventive methods and systems can be used to enhance recovery of fossil fuels. In particularly preferred embodiments, the invention can particularly relate to enhanced recovery of fossil fuels in a fluid form. In specific embodiments, a fluid form may mean a form that is flowable at standard temperature and pressure. The fossil fuel may be substantially in a fluid form while maintained within its formation (or reservoir), such as in the case of a crude oil of sufficiently low viscosity or natural gas. The fossil fuel also may be characterized as being in a fluid form after contact with the $CO_2$ and/or any steam or other heating and/or diluting material that may be used, such as in the case of bitumen, tar sands, oil shale, or the like.

The enhanced recovery methods of the invention can include delivering a $CO_2$ containing stream to a formation including a deposit for recovery. Although the $CO_2$ containing stream may include one or more further components, it is desirable for the $CO_2$ containing stream to comprise at least about 10%, at least about 20%, at least about 30%, at least about 40%, at least about 50%, at least about 60%, at least about 70%, at least about 80%, at least about 90%, at least about 95%, at least about 98%, or at least about 99% by weight $CO_2$ based on the overall weight of the stream. In further embodiments, the $CO_2$ containing stream may comprise about 50% to about 100%, about 60% to about 98%, about 70% to about 97%, or about 75% to about 95% by weight $CO_2$. As noted above, the $CO_2$ in the $CO_2$ containing stream may be in the form of a supercritical fluid or a gas. In some embodiments, the $CO_2$ containing stream can be characterized as consisting of $CO_2$. In other embodiments, the $CO_2$ containing stream can be characterized as consisting essentially of $CO_2$. In such embodiments, "consisting essentially of" specifically can mean any of the following: the $CO_2$ containing stream comprises less than 2% by weight of any non-$CO_2$ components; the $CO_2$ containing stream is expressly free of any further material that is typically recognized as being a fracture fluid; the $CO_2$ containing stream is expressly free of any proppants; or the $CO_2$ containing stream is expressly free of any surfactants.

As can be seen from the foregoing, the present invention specifically can provide methods for enhancing recovery of fossil fuel reserves. In various embodiments, the methods can be applied to any formation that may contain one or more of methane, other light hydrocarbon gases (e.g., $C_2$ to $C_4$ gases), oil of varying viscosities, bitumen, tar sands, and shale oil. For example, a method according to the invention can comprise: combusting a carbonaceous fuel to provide a combustion product stream comprising $CO_2$; and directing at least a portion of the $CO_2$ into a formation containing the fossil fuel for recovery. Further, the method can comprise receiving a fluid stream from the formation comprising a fraction of the fossil fuel from the formation and a fraction of the $CO_2$ injected into the formation. In further embodiments, at least a portion of the fossil fuel fraction recovered from the formation can be separated from the fluid stream. The separated fossil fuel fraction may comprise light oils, heavy oils, light gases, or high viscosity fuel materials (e.g., bitumen, tar sands, and shale oil). A plurality of separations may be applied to obtain from the fluid stream all of the marketable products, and such separations may result in isolation of non-hydrocarbon materials, including $CO_2$. In other embodiments, at least a portion of the recovered fluid stream can be recycled back into the combustion method. Specifically, the recycled stream may comprise $CO_2$ and/or a content of a recovered fossil fuel (e.g., a light gas fraction). Moreover, in embodiments for recovering mixed hydrocarbon products (e.g., including a gas fraction and a liquid oil fraction), it may be beneficial to separate the liquid fraction for market. The remaining gas fraction (including any impurities and $CO_2$) can be input directly to the combustor as all or part of the combustion fuel. Preferably, the content of the recovered fossil fuel can be sufficient to completely fuel the combustion process without requiring input of external fuel sources. In other embodiments, the portion of the recovered fossil fuel recycled into the system can be used to supplement an external fuel source. Such methods similarly can be applied to recovery of other types of formation deposits.

In further embodiments, the present invention can provide systems for providing $CO_2$ for recovery of a fossil fuel from a formation. For example, a system according to the invention can comprise the following: a combustor configured for receiving a carbonaceous fuel and having at least one combustion stage that combusts the fuel to provide a combustion product stream comprising $CO_2$; and one or more components for directing at least a portion of the $CO_2$ into the formation. The system also can comprise one or more components for power production, such as electricity generating turbine components, that may be in fluid connection with the combustor and/or may be positioned for power generation using a component of the recovered fuel material stream. The system further can comprise one or more components for receiving a fluid stream from the formation comprising a fraction of the fossil fuel from the formation and a fraction of the $CO_2$ directed into the formation. The system further can comprise one or more components for separating at least a portion of the recovered fossil fuel fraction from the fluid stream and/or one or more components for recycling at least a portion of the fluid stream back into the combustor. Such systems similarly can be adapted for recovery of other types of formation deposits.

In some embodiments, the invention can relate to the use of $CO_2$ in enhancing recovery of a fossil fuel via a fracturing process. Fracturing can be particularly useful in enhancing recovery of hydrocarbon gases, such as in coal beds and hydrocarbon-bearing, shale-containing formations, which typically contain methane ($CH_4$) and small amounts of other light hydrocarbon gases.

When a $CO_2$ containing treatment fluid is injected into an appropriate formation (such as described above, for example) at a pressure above the fracture pressure of the formation, the formations can be effectively fractured to stimulate production of methane and other hydrocarbon gases. The fracturing relieves stresses in the formation, decaps trapped gases, and creates pore spaces and channels for the flow of gas from the formation into a wellbore. Additionally, because of preferential displacement of absorbed or latticed methane by $CO_2$, further methane is evolved from the treatment than would otherwise occur with other fracturing treatments or with the use of other gases. The use of $CO_2$ also provides longer term enhancement of the overall gas production due the ability of $CO_2$ to displace methane. If enough methane is displaced in the localized area of the fracture face surrounding the wellbore, the pressure in the formation may also drop sufficiently low so that it falls below the critical desorption pressure of methane within the formation, which can result in spontaneous desorption and significant production of methane.

Fracturing according to the invention can be used with any formation where hydrocarbon production, particularly gaseous hydrocarbon production, is sufficiently impeded by low formation pressures and/or low formation permeability (i.e., a "tight" formation). Formations (e.g., shale formations, coal beds, and the like) having sufficiently low permeabilities so as to make fracturing a favorable method of enhancing recovery may include those having a permeability of less than about 10 mD, less than about 5 mD, less than about 1 mD, or less than about 0.5 mD.

A fracturing method according to the present invention may comprise introducing a $CO_2$ containing stream (such as through a well bore or other injection well) into a formation at a pressure that is above the fracture pressure of the formation. Fracturing methods can particularly comprise the use of a surface combustor. Accordingly, the $CO_2$ containing stream may essentially be the combustion product stream that exits the combustor. In other embodiments, $CO_2$ containing stream may be the stream that exits the turbine or other power production components. In still further embodiments, the $CO_2$ containing stream may be the stream that exits the components used in any separation process steps that may be carried out. Moreover, additional fracture materials may be added to the $CO_2$ containing stream at any point after combustion and immediately prior to introduction into the fracture (which may include combinations taking place within the well bore itself). Such additional components include, but are not limited to proppants, surfactants (e.g., aliphatic or oxygen-containing hydrocarbon polymers, hydrofluoropolymers, or perfluoropolymers, partially or fully fluorinated small molecules with molecular weights up to 400 grams per mole, perfluoroethers, neutral surfactants, charged surfactants, zwitterionic surfactants, fatty acid esters, and/or surfactants that give rise to viscoelastic behavior), gelling agents, or water (including brines). The $CO_2$ containing stream also can be characterized as being expressly free of any or all of the foregoing components or any further components that may be typically recognized as being useful in a fracture fluid. In addition, the $CO_2$ containing stream may be introduced into the formation simultaneously, before, after, or sequentially with water and/or a further fracture fluid or material.

Carbon dioxide can be particularly useful to displace methane from lattice structures, such as methane hydrates and methane clathrates, as well as to displace adsorbed methane from the surfaces, pore spaces, interstices, and seams of a formation. Other gases, such as nitrogen or air, typically do not exhibit a similar preferential tendency to displace the absorbed or latticed methane. Coal beds and gas hydrates, in particular, show preferential adsorption of or replacement by $CO_2$ compared to methane.

Because of the tendency for $CO_2$ to displace methane from lattice structures and displace adsorbed methane from the surfaces, pore spaces, interstices, and seams of a formation, $CO_2$ produced according to the present invention also can be specifically used to achieve these functions in the absence of fracturing. In other words, the $CO_2$ containing stream can be introduced into a formation, such as at a pressure below the fracture pressure of the formation but at a pressure sufficient to enter seams or cracks in the formation or at a pressure sufficient to enter at least a portion of the pores of the formation so as to displace adsorbed hydrocarbon gases or otherwise facilitate removal of hydrocarbon gases from the formation. This particularly may be beneficial for natural gas recovery from coal beds, sub-surface coal seams (particularly those that are deep and/or have one or both of economic and technical production problems), and shale gas formations where natural gas or other short chain hydrocarbon gases are associated with the solid materials and are preferentially displaced by the $CO_2$. While $CO_2$ in a fracturing method preferably is produced via surface combustion to allow for the optional inclusion of further materials, $CO_2$ for a pure gas recovery method without fracturing may be produced via surface combustion or in a down-hole combustor. The $CO_2$ containing stream that is injected into such formations through a first well bore (i.e., an injection well) displaces the hydrocarbon gases therefrom, at least partially combines with the displaced hydrocarbon gases, and facilitates recovery of the hydrocarbon gases from the formation, such as through the injection well or one or more recovery wells. The recovered hydrocarbon gases optionally can be treated, as further described below.

In addition to enhancing recovery of hydrocarbon gases, the inventive methods also may be used to both form and recover a fuel material. For example, $CO_2$ will react chemically with coal, particularly at elevated temperatures and pressures, to produce CO and $H_2$ (as well as water). Thus, $CO_2$ produced according to the present invention may be introduced to a coal formation so as to chemically react with the coal and form CO and $H_2$, which can be recovered as otherwise discussed herein and used as fuel materials—e.g., in the production of syngas. In certain embodiments, a multiple functions could be performed wherein injection of $CO_2$ into the coal formation can displace for recovery any hydrocarbon gases associated therewith, and/or react with the coal to form CO and $H_2$ for recovery, and/or sequester at least a portion of the $CO_2$ within the coal formation.

The $CO_2$ produced according to the present invention also can be useful for enhancing recovery of liquid fuel materials (e.g., crude oil) and even highly viscous fuel materials (e.g., bitumen, tar sands, and oil shale). The use of a $CO_2$ containing stream in relation to such liquid and/or highly viscous fuel materials can be effective to enhance the recovery thereof through a variety of methods, such as one or both of increasing formation pressure and altering the physical nature of the fuel material (e.g., reducing the viscosity thereof).

Oil displacement by $CO_2$ injection can depend upon the phase behavior of the mixtures of the $CO_2$ and the crude, which can depend upon a variety of factors, such as reservoir temperature, reservoir pressure, and crude oil composition. Although not wishing to be bound by theory, it is believed that the mechanisms that facilitate crude oil displacement can include oil swelling, viscosity reduction, and complete miscibility of the $CO_2$ and the crude oil. The methods of the present invention can provide for one or any combination of such mechanisms for enhancing recovery of oil and highly viscous hydrocarbons from a formation. Although the discussion below generally discusses removal of liquid hydrocarbons in relation to oil (or crude oil), it is understood that such disclosure can relate to enhancing recovery of oil of a wide range of viscosities and also can relate to enhancing recovery of other, highly viscous hydrocarbons—e.g., bitumen, tar sands, oil shale, and the like.

When $CO_2$ is injected into an oil reservoir, it can become mutually soluble with the residual crude oil as light hydrocarbons from the oil dissolve in the $CO_2$ and the $CO_2$ dissolves in the oil. The extent of such mutual dissolution can increase as the density of the $CO_2$ increases, which can particularly favor providing the $CO_2$ in a compressed (i.e., pressurized) form. Mutual dissolution also can be greater in formations wherein the oil contains a significant volume of "light" (i.e., lower carbon) hydrocarbons. When the injected $CO_2$ and residual oil are miscible, the physical forces holding the two phases apart (interfacial tension) effectively disappear. This enables the $CO_2$ to displace the oil from the rock pores, pushing it towards a producing well. As $CO_2$ dissolves in the oil it swells the oil and reduces the oil viscosity, which also helps to improve the efficiency of the displacement process.

Since the minimum pressure needed to attain mutual dissolution of the oil and the $CO_2$ can be a factor of reservoir temperature, reservoir pressure, $CO_2$ stream pressure, and oil density (i.e., the relative fraction of light hydrocarbons), the minimum pressure needed to attain oil/$CO_2$ miscibility can vary. Accordingly, in addition to controlling the nature of the injected $CO_2$ stream (i.e., temperature, pressure, and optional additives, such as steam), the invention can comprise additional treatments in addition to the $CO_2$ injection. For example, prior to, after, or simultaneous with $CO_2$ injection, the invention also can comprise water injection into the formation, which can be particularly beneficial to increase the reservoir pressure. More specifically, the invention may comprise alternating injection of the $CO_2$ stream with volumes of water. This technique may be referred to as water alternating gas (or "WAG") floods. Such method may be useful to mitigate any tendency for the lower viscosity $CO_2$ to creep ahead of the displaced oil. Other, similar techniques also can be encompassed by the present invention.

By way of example only, a $CO_2$ injection method for enhanced oil recovery according to the invention may be carried out as follows. First, combustion can be carried out as already described herein to produce a $CO_2$ containing stream (preferably comprising supercritical $CO_2$). The combustion may be carried out above ground or down-hole, and any intervening steps deemed appropriate under the specific circumstances of the formation being stimulated may be carried out (e.g., expansion for power production and/or separation of any stream components that are not desired for injection). Preferably, if surface combustion is used, the combustion system can be located significantly close to the injection well and/or the oil field where the $CO_2$ containing stream is to be used. The $CO_2$ particularly can be provided for injection at an injection pressure as otherwise described herein.

Next, the $CO_2$ containing stream exiting the combustor (or further system components as desired) can be directed to one or more injection wells strategically placed within a pattern to optimize the areal sweep of the reservoir. This can be via a relatively short transfer line as discussed above. When down-hole combustion is used, directing of the $CO_2$ containing stream can comprise simply outputting the $CO_2$ containing stream from the combustor and directly into the formation, such as through perforations in a well casing or through an open rock face. The injected $CO_2$ enters the reservoir and moves through the pore spaces of the formation rock. As the $CO_2$ moves through the reservoir and encounters deposits of crude oil, it can become miscible with the oil and form a concentrated oil bank that is swept towards the separate producing well(s)—which may include the injection well in some embodiments. In other words, the movement of the $CO_2$ containing stream through the reservoir enhances movement of the oil out of the formation and into the producing well(s). This may proceed because of the mutual solubility phenomenon described above and because the formation still exhibits a sufficient pressure to "push" the oil/$CO_2$ combination (which now has a reduced viscosity and/or density in relation the oil alone) to the open producing wells (which have a much reduced density in relation to the formation itself). Movement of the oil to the producing well(s) also may arise from an increase in the formation pressure arising from the injection of the $CO_2$ therein (and/or any other re-pressurizing materials that may be injected—e.g., water).

At the producing well(s), oil (typically as a mixture of oil, $CO_2$, water, and possibly hydrocarbon gases) is delivered to the surface (which typically can include active pumping) for processing, as described below. The $CO_2$ containing stream may be injected into a number of injection wells, and the pattern of injector wells and producer wells can change over time. Desirable patterns can be determined based on recognized engineering models, such as computer simulations that model the reservoir's behavior based on different design scenarios.

Although the use of $CO_2$ in stimulating oil and gas wells has previously been known, it is well recognized that $CO_2$ EOR is a capital-intensive undertaking with the single largest project cost typically being the cost to purchase the $CO_2$ for injection, particularly at the necessary pressure and purity. It has been estimated that in EOR procedures, the total $CO_2$ costs (both purchase price and recycle costs) can amount to 25 to 50 percent of the cost per barrel of oil produced. The present invention can overcome such limitations by providing a continuous source of $CO_2$ that is formed in close proximity to the injection sites and can even be formed down-hole to even further eliminate $CO_2$ transportation costs. Moreover, $CO_2$ production costs can be effectively offset through power production via a pre-injection cycle as described above and even through power production using the production stream in some embodiments. Moreover, as additionally described herein, combustion fuel costs can be significantly offset through use of a fraction of the fuel materials recovered in the enhanced recovery process (including liquid and gaseous fuel materials).

In addition to the high up-front capital costs of a $CO_2$ supply/injection/recycling scheme, the initial $CO_2$ injection volume typically must be purchased well in advance of the onset of incremental production. Accordingly, the return on investment for $CO_2$ EOR has tended to be low, with only a gradual, long-term payout. Given the significant front-end investment in wells, recycle equipment, and $CO_2$, the time delay in achieving an incremental oil production response, and the potential risk of unexpected geologic heterogeneity significantly reducing the expected response, $CO_2$ EOR has heretofore been considered a risky investment by many operators, particularly in areas and reservoirs where it has not been implemented previously. Moreover, it has previously been understood that oil reservoirs with higher capital cost requirements and less favorable ratios of $CO_2$ injected to incremental oil produced will not achieve an economically justifiable return on investment without improved technology and/or fiscal/tax incentives for storing $CO_2$. Again, the present invention overcomes these shortcomings and makes $CO_2$ based enhanced recovery methods economically justifiable and even advantageous across a wide range of fuel material deposits and even further types of deposits.

As already noted above, the methods and systems of the present invention can be particularly beneficial in light of the ability to position the combustor apparatus down-hole within the reservoir or formation. Such embodiments can be particularly useful in EOR methods. More specifically, down-hole combustor embodiments can be highly advantageous for use with bitumen-containing formations, for use in tar sands, for use in oil shale extraction, and for use with heavy oil generally—i.e., oil having an American Petroleum Institute (API) gravity of below about 20. In specific embodiments, the inventive methods and systems particularly can be used in formations containing oil with an API gravity that is less than about 19, less than about 18, less than about 17, less than about 16, less than about 15, less than about 14, less than about 13, less than about 12, less than about 11, less than about 10, less than about 9, or less than about 8. API gravity can be directly measured using a hydrometer graduated with API gravity units as detailed in ASTM D287. Alternately, API gravity may be calculated from the density of the oil, which can be measured using either a hydrometer, as detailed in ASTM D1298, or with an oscillating U-tube method, as detailed in ASTM D4052. Density adjustments at different temperatures, corrections for soda-lime glass expansion and contraction and meniscus corrections for opaque oils are detailed in the Petroleum Measurement Tables details of usage specified in ASTM D1250. The specific gravity is then calculated from Formula 1 below, and the API gravity is calculated from Formula 2 below.

$$SG\ oil = \frac{\rho_{oil}}{\rho_{H_2O}} \qquad \text{Formula 1}$$

$$API\ gravity = \frac{141.5}{SG} - 131.5 \qquad \text{Formula 2}$$

Use of a down-hole combustor in the enhanced recovery of fuel material deposits from a formation according to certain embodiments of the invention is illustrated in the flow diagram of FIG. 1. Particularly, the figure illustrates a cross-section of a typical geological formation consisting of (from top to bottom) a top soil layer 2, a low porosity rock layer 3

(such as shale) that does not permit significant oil infiltration, a medium porosity rock layer 4 that may or may not allow for oil infiltration, an oil containing layer 5 (such as sandstone or limestone) that has a sufficient porosity to contain oil and possibly allow for free flow therefrom to a lower pressure zone, and a further medium porosity rock layer 6. It is understood that such geological formation is only exemplary, and geological formations that may benefit from the methods of the present invention may have more or fewer layers with a variety of different configuration, including crossing of layers. Moreover, the discussion in relation to an oil containing layer should not be viewed as limiting down-hole combustion to only such formations.

An injection well 100 is shown penetrating the various geological formation layers including the oil containing layer 5. Although a single injection well is shown, it is understood that a plurality of injection wells could be utilized. Moreover, the injection well may be a pre-existing well bore that is modified, if necessary, to accommodate the down-hole combustor (or its products) or may be a purposefully formed drill hole. The illustrated injection well 100 includes a conductor casing 101, a surface casing 102, and a production casing 103, each of which may be cemented in position. Interior to the production casing is a working pipeline 104 that is utilized for delivery of combustion materials. In some embodiments, the working pipeline may be absent, and delivery of combustion materials may proceed through the production casing. In instances where a well is formed expressly for the purpose of down-hole combustion, casing combinations may vary or be essentially absent. For example, the injection well could comprise simply a conductor, a surface casing, and an open bore hole extending below the lower edge of the surface casing. In the illustrated embodiment, an injection packing plug 110 for use as a pressure seal is provided near the lower terminus of the working pipeline 104 to isolate the upper portion of the well from the combustion zone 112 below.

Within the combustion zone 112 is a combustor 300, such as a transpiration cooled combustor as described otherwise herein. The combustor is geographically aligned with the oil containing layer (or formation) relatively low in the formation. The exact location within the formation may vary—e.g., high in the formation to favor downward movement of the injected materials or low in the formation to favor upward permeation of the injected materials—and such location can depend upon the exact nature of the injected materials and the exact nature of the deposit to be recovered from the formation). In particular embodiments, it may be desirable to use one or more non-vertical wells as an injection well. For example, the injection well may include one or more diagonal or horizontal sections from which the $CO_2$ containing stream may be injected into the formation. The injection well likewise may include one or a plurality of branches that may be any of vertical, horizontal, or diagonal in relation to the surface at ground level. In further embodiments, the combustor or components directing the $CO_2$ containing stream may be situated on rails or pulleys or may utilize other mechanisms to allow it to move in all potential directions. Valves that control the flow to various portions of the combustor can also be used to control the direction of $CO_2$ flow.

A combustion fuel source 10 provides combustion fuel down-hole to the combustor 300, such as via an associated pipeline or otherwise suitable delivery means. As further described below, the combustion fuel may be a fraction of the recovered fuel material from the deposit formation. An oxidant source 20 (which is an air separation unit providing $O_2$ by way of example in this embodiment) provides $O_2$ (preferably in a substantially purified form, as described above) down-hole to the combustor, such as via an associated pipeline or otherwise suitable delivery means. A $CO_2$ stream 30 also is provided for passage through the combustor. In the illustrated embodiment, the $CO_2$ stream converges with the $O_2$ stream from the oxygen source at mixer 25. Alternately, the $CO_2$ stream may go directly to the combustor in a separate delivery line. Still further, an additional or different mixer apparatus may be used to combine the fuel, oxygen, and $CO_2$ prior to passage into the combustor. In embodiments where $CO_2$ from combustion is significantly sequestered within the injected formation or is not recycled to the combustion method, the $CO_2$ stream may be absent. In the illustrated embodiment, the combustion system further includes a quenching fluid source 40, which may specifically provide water, a different quenching fluid (including $CO_2$), or mixtures of quenching fluids to the combustor via an associated pipeline or otherwise suitable delivery means. The quenching fluid may specifically be delivered to the combustor as a transpiration cooling fluid. Additionally, the $CO_2$ stream may be delivered to the combustor through the quenching fluid source (particularly when $CO_2$ may be desired for use as a transpiration cooling fluid).

When the combination of feeds (i.e., $O_2$, water, $CO_2$, and fuel) are delivered to the combustor, combustion can proceed, and the combustion products exiting the combustor can include one or more of heat, steam, $CO_2$, and reaction by-products as otherwise discussed herein. The combustor can be described as having an input zone wherein the fuel and further materials are delivered and an output zone from which the combustion product stream is produced. As seen in FIG. 1, the production casing 103 can include one or more perforations 105, which can be located significantly in the area of the combustor 300 or may be spaced at varying locations corresponding to the oil producing formation. Such perforations can provide passage of the combustion product stream out of the well and into the oil containing formation. In other embodiments, the production casing 103 may be absent, at least within the oil producing formation, and the combustion product stream can readily flow through the formation pores.

Propagation of the combustion products through the producing formation facilitates recovery of the formation deposits (e.g., oil) through one or more producing wells 200. Such propagation of the combustion products and the formation deposits is illustrated by the block arrows in FIG. 1. The unfilled arrows represent combustion product entering the formation. The successively darker arrows represent formation deposits (e.g., oil) that are miscible with the $CO_2$ and, having a now reduced viscosity (and optionally increased temperature from steam treatment and/or increased pressure), proceed into the producing well. In some embodiments, the injection well 100 may be configured so as to inject the combustion product stream at a first zone within a producing formation and to receive produced formation deposits in a second zone within the producing formation. For example, injection of the combustion product stream could proceed from the production casing below the packing plug 110, and deposits could enter the production casing above the packing plug through one or more additional perforations (not shown), and the recovered deposits could flow through the annular space between the production casing 103 and the working pipeline 104.

The separate producing well 200 shown in FIG. 1 includes a conductor casing 201, a surface casing 202, and a production casing 203, each of which may be cemented in position. In this embodiment, the production casing only extends a short distance below the lower terminus of the surface casing, and the remaining portion of the well therebelow is illustrated as simply an open well bore 206. In other embodiments, the production casing may extend further down within the well, and the open well bore could in fact include a liner or casing that could be perforated or otherwise porous to allow passage of produced deposits into the well. Interior to the production casing is a producing pipeline 204 that is utilized for delivery of the recovered deposits to the surface, and the producing pipeline is surrounded near the lower terminus thereof with a production packing plug 210.

The recovered deposit stream 250 delivered to the surface of the producing well 200 may undergo one or more processing steps. For example, the recovered deposit stream may pass through an expander 320 to reduce the pressure of the stream. The optionally reduced pressure stream may pass through a separation unit 330, such as to separate a heavy oil stream 332 from a light gas stream 334. The light gas stream may proceed through a gas separator 340 that can isolate a hydrocarbon gas stream 342 from any $CO_2$ (and/or impurities—e.g., $H_2S$) combined with recovered deposit stream. The expanded $CO_2$ stream 344 can optionally proceed through a power generation turbine 350 to produce electricity (E), and the expanded $CO_2$ stream 30 can proceed to the mixer 25 for combining with the $O_2$ stream for re-injection into the injection well 100. In alternate embodiments any of streams 250, 332, 334, 342, and 344 could be input directly to the combustion system, particularly if any of the intervening pressure adjustment, separation, or power production components are not needed or desired.

In some embodiments, rather than separating out the light gases, such component may remain in combination with the $CO_2$ stream for input to the combustor. In this manner, the requirement of a separate fuel source for the combustor can be partially or completely eliminated. In effect, a method according to the invention thus can produce a crude oil product for market, and any produced light gases can be used as the fuel source for the combustor to form further $CO_2$ to continue the EOR operation. Still further, the gas separation step may still occur, and any separated hydrocarbon gases can be delivered to the combustor as the fuel source. Further embodiments related to separation of components of the product recovery stream are otherwise discussed herein.

In some embodiments, it can be useful to specifically proportion the ratio of oxidant to $CO_2$ that is input to the combustor. For example, the amount of oxidant introduced to the combustor can be less than about 50% by weight of the amount of $CO_2$ introduced into the combustor. In further embodiments, the amount of oxidant introduced to the combustor can be less than about 45%, less than about 40%, less than about 35%, or less than about 30% by weight of the amount of $CO_2$ introduced into the combustor. In specific embodiments, the amount of oxidant introduced to the combustor can be about 10% to about 50%, about 10% to about 45%, about 12% to about 40%, about 12% to about 35%, or about 15% to about 30% by weight of the amount of $CO_2$ introduced into the combustor.

In certain embodiments, it can be particularly desirable to produce a significant quantity of steam as part of the combustion process. Specifically, water may be added to the combustion cycle (e.g., as a quenching fluid in the combustor) and may particularly be input to the combustor as a transpiration coolant. Thusly, in addition to $CO_2$, the combustion process also can provide a relatively large volume of steam. In certain embodiments, the steam fraction may be less than about 50%, less than about 40%, less than about 30%, less than about 20%, less than about 10%, or less than about 5% of the combustion stream on a mass to mass basis. If desired, however (such as in a thermal EOR process), the steam fraction may be greater than 50% by mass of the combustion product stream.

In advantageous embodiments, the invention can be characterized in relation to the down-hole use of the combustor with an excess of oxidant (e.g., $O_2$ or air). In specific embodiments, the amount of $O_2$ that is provided in excess of the stoichiometrically necessary content for combustion of the fuel is at least about 0.1%, at least about 0.2%, at least about 0.25%, at least about 0.5%, or at least about 1.0% on a molar basis. In other embodiments, the stoichiometric excess of $O_2$ over the amount necessary for combustion of the fuel is about 0.1% to about 5%, about 0.15% to about 4%, about 0.2% to about 3%, or about 0.25% to about 2.5% on a molar basis. The amount of air that is provided in excess of the stoichiometrically necessary content for combustion of the fuel can be up to about a 40 fold excess. Providing such stoichiometric excess can be useful to ensure complete combustion of the carbonaceous fuel (which has the same characteristics as described above with the ability to accept directly the produced, enhanced recovery off-gas). This is desirable because it can substantially or completely eliminate production of carbon (i.e., soot), which could substantially plug the formation. For example, the provision of a large excess of oxidant can be effective to oxidize coal to produce carbon monoxide (CO). In particular embodiments, carbon production can be limited such that the combustion product stream comprises less than about 2%, less than about 1.5%, less than about 1%, less than about 0.5%, less than about 0.25%, or less than about 0.1% by weight of particulate carbon (or soot).

Providing an excess of oxidant (particularly $O_2$) is counterintuitive in relation to an oil or natural gas well since such wells typically require that any $O_2$ present be strictly defined at a very low level to avoid problems of algae growth or sulfur deposition. In the present combustion systems and methods, however, the excess $O_2$ is provided as part of a high temperature gas stream. Under the conditions described herein, any excess $O_2$ remaining after combustion may be effectively removed by side reactions with hydrocarbons in the reservoir. For example, the following reactions may occur under such conditions.

$$Coal(CH_x) + O_2 = CO + 0.5 \times H_2O \quad \text{Formula 3}$$

$$2CO + O_2 = 2CO_2 \quad \text{Formula 4}$$

$$CO_2 + C = 2CO \quad \text{Formula 5}$$

$$CO + H_2O - CO_2 + H_2 \quad \text{Formula 6}$$

$$H_2 + O_2 = H_2O \quad \text{Formula 7}$$

$$Oil(CH_2)x + O_2 = CO + XH_2O \quad \text{Formula 8}$$

It is expected that the reactions of Formulas 4-7 likewise would follow the reaction of Formula 8.

In addition to the foregoing, the use of a down-hole combustor with transpirationally injected water flow can be particularly advantageous for controlling the temperature of the enhanced recovery fluid stream. More specifically, the water content (and optionally the $CO_2$ stream) can be adjusted as necessary to directly cool the combustion product stream to a user-designed, controlled temperature that can be set for maximum oil recovery in the particular reservoir. For example, combustion product stream temperatures can be controlled in the range of about 100° C. to about 1,800° C. or any of the further ranges otherwise disclosed herein.

Although down-hole combustion has been previously discussed in the art, such methods differ from the present invention because the combustion in the known systems does not include a where sufficiently high temperatures and pressures can be achieved to facilitate combustion of even contaminated fuels, as further discussed below. Moreover, known down-hole combustion techniques typically have required the use of a solid support catalyst to prevent soot production and plugging of the face of the oil-producing formation. As already noted above, the present invention can eliminate the requirement of such catalyst systems. If desired, however, in particular embodiments, combustion according to the present invention (either surface combustion or down-hole combustion) also may incorporate the use of a catalyst.

Figure 2:
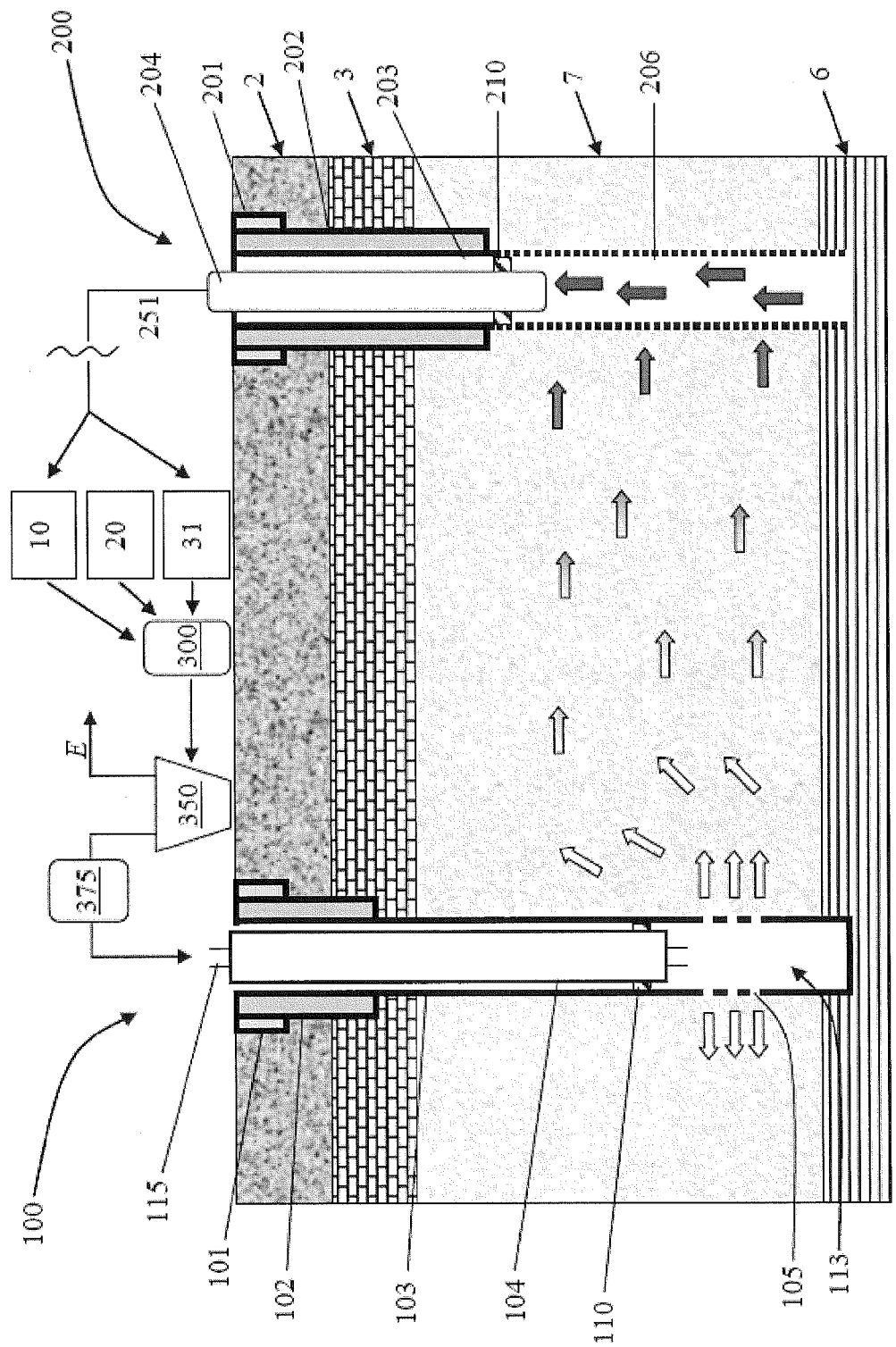
FIG. 2 provides a cross-section of a typical geological formation bearing natural gas as a deposit and illustrates a system and method of enhancing recovery of the natural gas in the deposit through combustion of a fuel in a surface combustor according to an embodiment of the invention to produce $CO_2$ that is directed into the formation from an injection well to enhance recovery of the natural gas via a producing well with optional processing of the produced natural gas.

Particular embodiments encompassing surface combustion are illustrated in FIG. 2. As seen therein, the general nature of the system and method is similar to down-hole combustion in that a fuel source 10 provides combustion fuel to the combustor 300 positioned at the surface, preferably substantially close to the injection well 100. An oxygen source 20 (such as an air separation unit in this exemplary embodiment) provides $O_2$ (preferably in a substantially purified form, as described above) to the combustor. A working fluid source 31 also is included to provide the working fluid, such as a $CO_2$ stream, for passage through the combustor. Optionally, a further quenching fluid, such as water, could be provided to the combustor. The quenching fluid and/or the working fluid may specifically be delivered to the combustor as a transpiration cooling fluid per the discussion already provided above. A mixer apparatus may be used to combine the fuel, oxygen, and $CO_2$ prior to passage into the combustor.

By way of example, FIG. 2 illustrates a cross-section of a typical geological formation consisting of (from top to bottom) a top soil layer 2, a low porosity rock layer 3 (such as shale), a fossil fuel reservoir and/or coal bed layer 7 that includes methane and possibly other light hydrocarbons therein, and further medium porosity rock layer 6. Again, the actual layering of geological strata may vary.

The injection well 100 is shown penetrating the various geological formation layers including the coal bed layer 7. Although a single injection well is shown, it is understood that a plurality of injection wells could be utilized. Moreover, the injection well may be a pre-existing well bore that is modified, if necessary, to facilitate $CO_2$ flow or may be a purposefully formed drill hole. The illustrated injection well 100 includes a conductor casing 101, a surface casing 102, and a production casing 103, each of which may be cemented in position. Interior to the production casing is a working pipeline 104 that includes a central pipe 115 for injection of the $CO_2$ containing stream into the well. In some embodiments, the working pipeline may be absent, and delivery of the $CO_2$ containing stream may proceed through the central pipe alone. In the illustrated embodiment, an injection packing plug 110 for use as a pressure seal is provided near the lower terminus of the working pipeline 104 to isolate the upper portion of the well from the injection zone 113 below.

As illustrated in FIG. 2, the production casing 103 can include one or more perforations 105, which can be spaced at varying locations within the coal bed formation. Such perforations can provide passage of the combustion product stream out of the well and into the coal bed. In other embodiments, the production casing 103 may be absent, at least within the coal bed formation, and the combustion product stream can readily flow through the pores in the face of the coal bed and/or through seams in the coal bed.

In particular embodiments, it may be desirable to use one or more non-vertical wells as an injection well. For example, the injection well may include one or more diagonal or horizontal sections from which the $CO_2$ containing stream may be injected into the formation. The injection well likewise may include one or a plurality of branches that may be any of vertical, horizontal, or diagonal in relation to the surface at ground level. The injection may again have the potential or translational, axial, and rotational movement.

In operation, a fuel source 10 provides combustion to the combustor 300, such as via an associated pipeline or otherwise suitable delivery means, and such fuel may be a fraction of the fuel material recovered from the deposit formation. An oxygen source 20 (such as an air separation unit) provides $O_2$ (preferably in a substantially purified form, as described above) to the combustor, such as via an associated pipeline or otherwise suitable delivery means. A $CO_2$ stream 31 also is provided for passage through the combustor. In the illustrated embodiment, the $CO_2$ stream preferably functions as a working fluid, and/or a quenching fluid, and/or a transpiration fluid. If desired, a different working fluid and/or quenching fluid and/or transpiration fluid (which may be the same or different) may be used, and separate sources for each stream may be provided. A mixer apparatus may be used to combine the fuel, oxygen, and the working fluid prior to passage into the combustor.

The combustor 300 includes an output from which flows a combustion product stream, which can be described as a $CO_2$ containing stream. The $CO_2$ may be in any form as already discussed above. The combustion product stream is input to a turbine 350 to produce electricity (E), and the turbine output stream is directed either to further processing or the injection well. Processing components 375 may include one or more of a heat exchanger, a separation unit (e.g., for removing water or trace impurities), a compressor, an expander, and a cooling unit. The $CO_2$ containing stream—either exiting the turbine or a processing component—is at least partially directed into the well via the central pipe 115 and enters the coal bed formation 7 through the perforations 105 in the production casing 103.

Propagation of the $CO_2$ containing stream through the coal bed facilitates recovery of the formation deposits (e.g., methane) through one or more producing wells 200. Such propagation of the combustion products and the formation deposits is illustrated by the block arrows in FIG. 2. The unfilled arrows represent the $CO_2$ containing stream entering the formation. The successively darker arrows represent formation deposits (e.g., methane) that commingle with the $CO_2$ and/or are simply displaced by the $CO_2$ and proceed into the producing well. In some embodiments, the injection well 100 may be configured so as to inject the combustion product stream at a first zone within a producing formation and to receive produced formation deposits in a second zone within the producing formation. For example, injection of the combustion product stream could proceed below the packing plug 110, and deposits could enter the production casing above the packing plug through one or more additional perforations (not shown), and the recovered deposits could flow through the annular space between the production casing 103 and the working pipeline 104.

The separate producing well 200 shown in FIG. 2 includes a conductor casing 201, a surface casing 202, and a production casing 203, each of which may be cemented in position. In this embodiment, the production casing only extends a short distance below the lower terminus of the surface casing, and the remaining portion of the well therebelow is illustrated as simply an open well bore 206. In other embodiments, the production casing may extend further down within the well, and the open well bore could in fact include a liner or casing that could be perforated or otherwise porous to allow passage of produced deposits into the well. Interior to the production casing is a producing pipeline 204 that is utilized for delivery of the recovered deposits to the surface, and the producing pipeline is surrounded near the lower terminus thereof with a production packing plug 210 that provides a seal.

The recovered methane stream 251 delivered to the surface of the producing well 200 may undergo one or more processing steps, and all or a portion of the methane stream may be directed back into the combustor system. For example, the recovered deposit stream may be processed through one or more of an expander to reduce the stream pressure, one or more separation units to separate a pure methane stream for market and/or separate a further hydrocarbon gas stream from any $CO_2$ (and/or impurities—e.g., $H_2S$), and a further power generation turbine, all of which are described above in relation to FIG. 1. As illustrated in FIG. 2, a fraction of the methane stream 251 may be directed to the fuel source. This fraction may be a combination of one or more hydrocarbon gases and may include any impurities produced in the methane stream. A further fraction of the methane stream may be directed to the working fluid source. This fraction may be a separated $CO_2$ stream and may include any impurities produced in the methane stream.

The choice of using surface combustion or down-hole combustion can depend upon a variety of factors, including the type of material to be recovered and the physical conditions of the formation. Typically, either system may be employed for enhanced recovery of any fossil fuel that is in a fluid form—e.g., gaseous hydrocarbons, low viscosity oils, and even high viscosity oils. For very high viscosity oils and other highly viscous hydrocarbons (e.g., bitumen, tar sands, and shale oil), the down-hole combustion systems can be advantageous because of the ability to easily provide a high temperature combustion product stream that can include a significant fraction of steam, which can be beneficial to increase fluidity of such higher viscosity materials.

With either surface combustion or down-hole combustion, a variety of combustion fuels may be used. Specifically, gaseous hydrocarbons and liquid petroleum may be used, and the combustion fuel thus may be formed at least in part from the fuel material that is recovered by the methods. The combustion methods also can encompass solid fuels as the combustion fuel. For example, coal could be used, preferably in a particularized and fluidized state. In such embodiments, it may be useful for the inventive systems to include a plurality of combustors.

Figure 3:
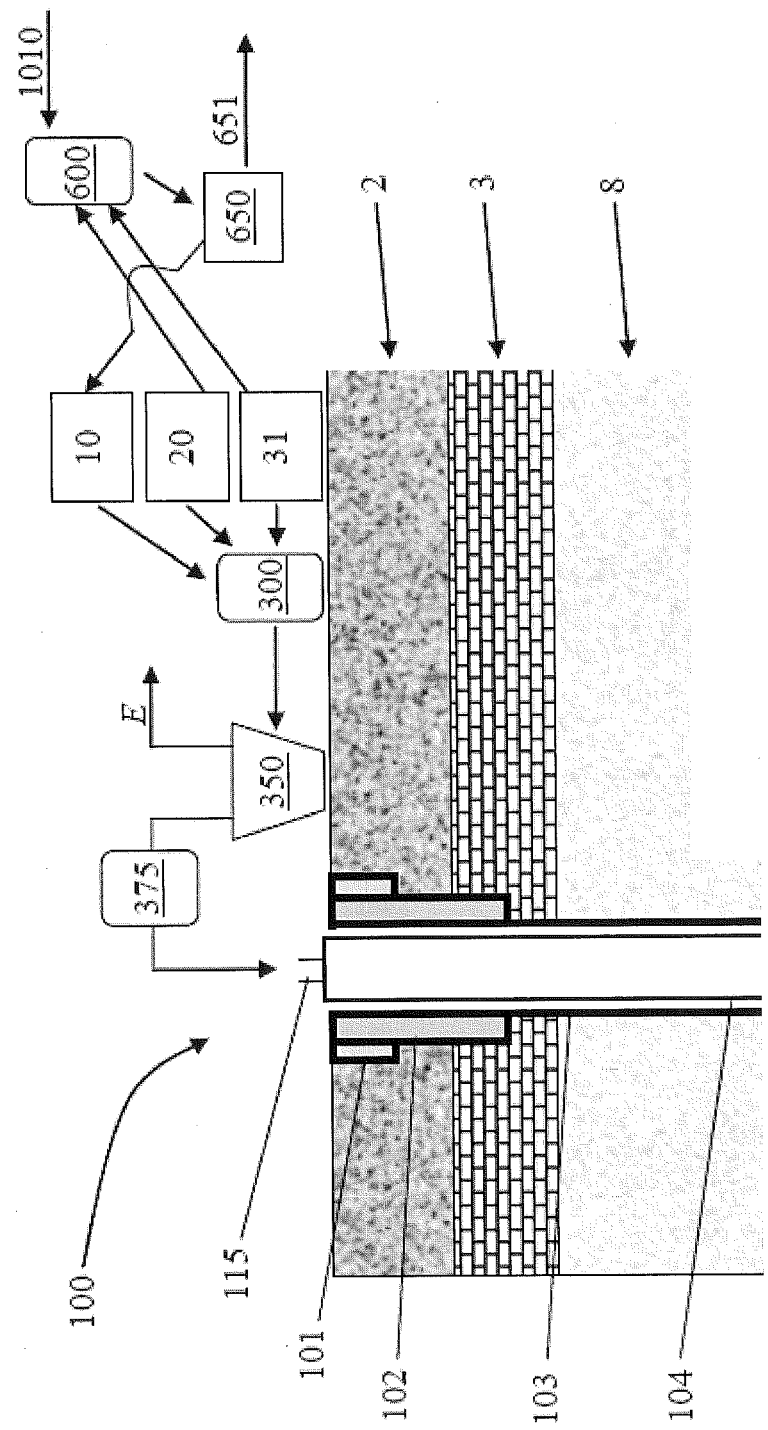
FIG. 3 provides a cross-section of a portion of a typical geological formation bearing a fossil fuel and illustrates a system and method of enhancing recovery of the fossil fuel through combustion of a fuel to produce $CO_2$ that is directed into the formation from an injection well, wherein a dual combustor system and method is provided to facilitate the use of combustion fuels that may form ash or other particulate materials as a combustion product.

For example, FIG. 3 illustrates a partial view of the surface combustion embodiment illustrated in FIG. 2 as modified to incorporate a partial oxidation combustor 600. FIG. 3 illustrates a cross-section of a typical geological formation consisting of (from top to bottom) a top soil layer 2, a low porosity rock layer 3 (such as shale), and a fuel material reservoir 8. As in the previous figures, the injection well 100 is shown penetrating the various geological formation layers including the fuel material layer 8. Although a single injection well is shown, it is understood that a plurality of injection wells could be utilized. Moreover, the injection well may be a pre-existing well bore that is modified, if necessary, to facilitate $CO_2$ flow or may be a purposefully formed drill hole. The illustrated injection well 100 includes a conductor casing 101, a surface casing 102, and a production casing 103, each of which may be cemented in position. Interior to the production casing is a working pipeline 104 that includes a central pipe 115 for injection of the $CO_2$ containing stream into the well. In some embodiments, the working pipeline may be absent, and delivery of the $CO_2$ containing stream may proceed through the central pipe alone. One or more recovery wells as illustrated in FIG. 1 and FIG. 2 likewise could be included in the present embodiments.

As shown in FIG. 3, a solid coal fuel 1010 is provided to the partial oxidation combustor 600, which is the first combustor in the series. Although the embodiment is discussed in relation to coal, it is understood that any solid fuel material could be used as described. Preferably, the solid fuel, such as coal, can be particularized, such as by being passed through a mill apparatus. This could be performed on-site, or the solid fuel could be provided in a pre-particularized form. The particularized size could be so as to provide an average particle size of about 10 μm to about 500 μm, about 25 μm to about 400 μm, or about 50 μm to about 200 μm. The powdered coal can be mixed with a fluidizing substance to provide the coal in the form of a slurry (which may be a slurry with $CO_2$).

In addition to the solid coal fuel 1010, $O_2$ from the oxygen source 20 and $CO_2$ from the working fluid source 31 can be provided to the partial oxidation combustor 600. The $CO_2$ may be optional and may be the source of the fluidizing medium. The $CO_2$ also may be used for cooling the partial oxidation combustor 600. Preferably, the amount of $CO_2$ used is sufficient to cool the temperature of the partial oxidation combustion stream exiting the partial oxidation combustor such that any ash that is present is in a solid form that can be safely removed. Accordingly, the $CO_2$, coal, and $O_2$ can be provided to the partial oxidation combustor in ratios such that the coal is only partially oxidized to produce a partially oxidized combustion product stream comprising $CO_2$ along with one or more of $H_2$, CO, $CH_4$, $H_2S$, and $NH_3$. The $CO_2$, coal, and $O_2$ also preferably can introduced into the partial oxidation combustor 600 in necessary ratios such that the temperature of the partially oxidized combustion product stream is sufficiently low that all of the ash present in the stream is in the form of solid particles that can be easily removed by one or more separators and/or filters—e.g., a cyclone filter. As shown in FIG. 3, ash removal via filter 650 is shown. In specific embodiments, the temperature of the partially oxidized combustion stream can be less than about 1,100° C., less than about 1,000° C., less than about 900° C., less than about 800° C., or less than about 700° C. In further embodiments, the temperature of the partially oxidized combustion stream can be about 300° C. to about 1,000° C., about 400° C. to about 950° C., or about 500° C. to about 900° C. The filtered, partially oxidized combustion stream leaving the filter 650 can be directly input into the transpiration cooled combustor 300. This input is provided along with the $O_2$ stream from the oxygen source 20 and the recycled $CO_2$ working fluid from the working fluid source 31. Combustion at this point can proceed similarly as otherwise described herein. The combustible materials in the partially oxidized combustion stream are combusted in combustor 300 in the presence of $O_2$ and $CO_2$ to provide the combustion stream comprising $CO_2$. This stream can be expanded across a turbine 350 to produce power (e.g., via generator). The turbine discharge stream can be passed through one or more processing components 375, and input to the central pipe 115 for injection into the well. Of course, it is understood that such partial oxidation embodiments could be adapted to the down-hole combustor embodiments, as otherwise described herein, particularly in relation to FIG. 1.

The present invention also provides general improvements over $CO_2$ flooding methods known in the art. Because the $CO_2$ containing stream formed and used in the present invention is a combustion product stream, the $CO_2$ containing stream also can provide a significant amount of heat to the formation. The heat of combustion thus may be transferred to a portion of the formation, and such heating can function to facilitate enhanced recovery of the deposits therein, particularly in relation to fossil fuels. If desired, the $CO_2$ containing stream can even be provided at temperatures sufficient to facilitate cracking of long chain hydrocarbons, such as in a crude oil formation. This can be particularly useful for enhancing recovery of high viscosity oils and even other highly viscous deposits.

In any of the systems and methods that may be utilized according to the invention, the production stream removed from the producing well or wells typically will comprise a mixture of materials. For example, the recovered fossil fuels can include a fraction (and even high amounts in certain cases) of hydrogen sulfides, which may be removed, if desired, to provide an essentially pure fossil fuel stream. Likewise, any $CO_2$ passing through the formation and into the recovery stream typically must be removed to provide a saleable fossil fuel. The present invention that utilizes a combustion process to provide the $CO_2$ containing stream used for enhanced recovery can mitigate or eliminate the adverse effects of the presence of impurities in a recovered fossil fuel stream. For example, since the combustion process can be integrated with a highly efficient and clean supercritical power cycle using $CO_2$ as the working fluid (such as referenced above), such cycle can deal effectively with fuel streams containing a large fraction of sulfur compounds (and other impurities). Accordingly, mixtures of fossil fuels, $CO_2$, $H_2S$, and further impurities can be used as the fuel in the combustion process, even with high $CO_2$, $H_2S$, and/or other impurity fractions. Therefore, by way of example, a variety of combinations of oils, light gases, $CO_2$, sulfur compounds, and other impurities can be directly injected into the power production cycle for use in combustion and power generation to produce additional $CO_2$ and electricity. Likewise, in high pressure, high temperature, down-hole combustion embodiments, the input combustion fuel can range from being an essentially pure hydrocarbon to being a mixture of one or more hydrocarbon fuels with a variety of impurities in a variety of combinations. In other words, the combustion process according to the invention that produces $CO_2$ for injection in enhanced recovery techniques can proceed essentially unimpeded including in the presence of even significant amounts of impurities.

The fraction of a recovery stream that is utilized as a combustion fuel in the combustor for production of further $CO_2$ for enhanced recovery (and, optionally, power production) can vary depending upon the nature of the formation and any saleable materials that may be withdrawn from the stream. For example, in enhanced oil recovery, the recovery stream will include crude oil and possibly water, gaseous hydrocarbons, and/or $H_2S$. In some embodiments, it may be useful for a fraction of the crude oil to be used as the combustion fuel. Typically, such use will occur after the oil recovery stream has undergone separation steps useful for withdrawing other components of the stream, such as natural gas and/or water.

Figure 4:
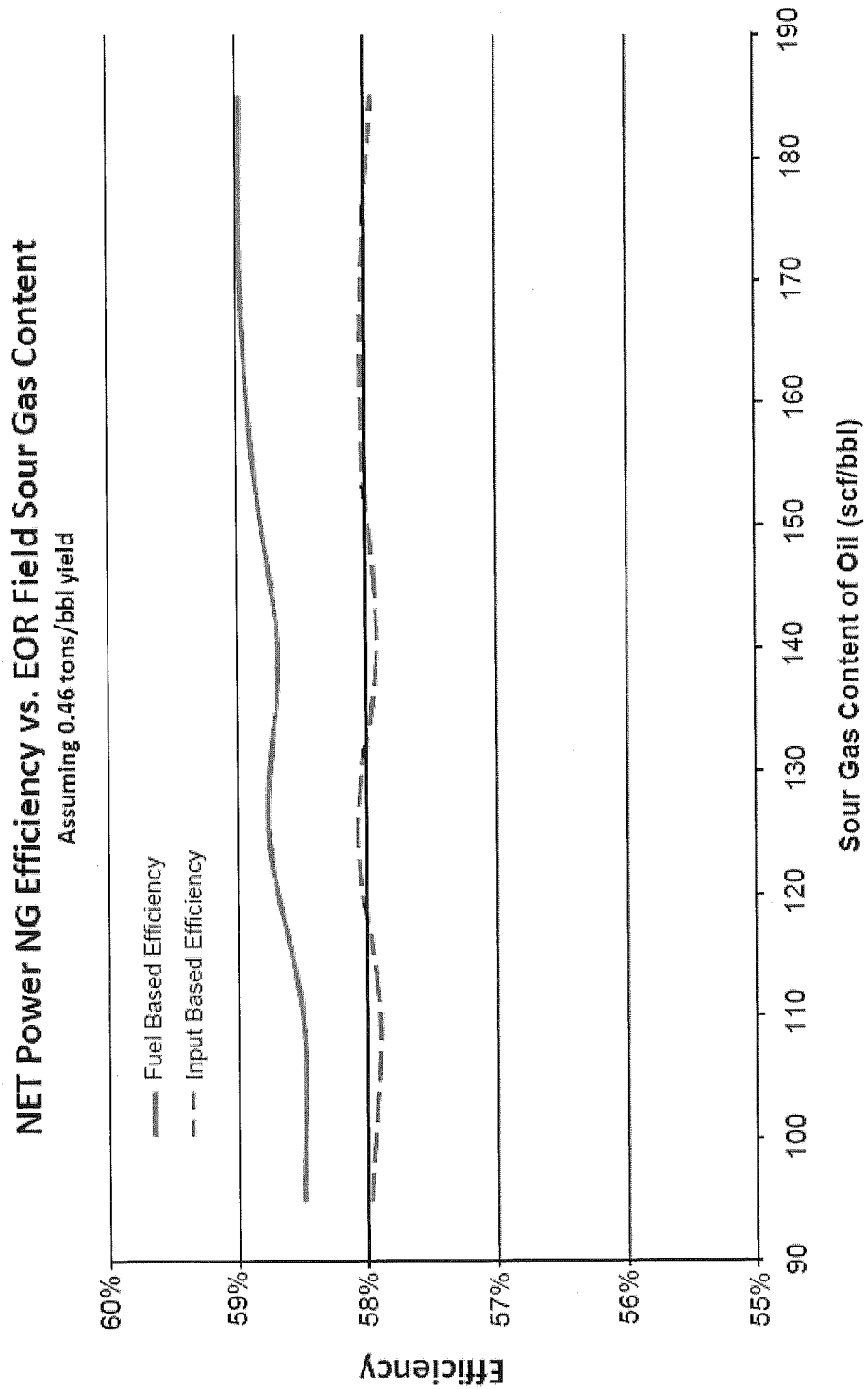
FIG. 4 provides a graph illustrating efficiency of a power production method according to one embodiment of the invention wherein sour gas (i.e., natural gas with an $H_2S$ content) is used as a combustion fuel, the efficiency being shown as a function of the content of the $H_2S$ in the crude oil recovery stream from which the sour gas was separated.

When a recovery stream comprising crude oil also contains a sufficient fraction of gaseous hydrocarbons, specific processing steps can be applied to separate the gaseous hydrocarbons from the crude oil. The gaseous hydrocarbons (inclusive of various impurities included therein) can be used then as the combustion fuel. In specific embodiments, the gaseous hydrocarbons (which may mainly comprise methane as the gaseous hydrocarbon component) may include a significant content of $H_2S$. The present invention is particularly useful in that the sour gas can be directly input into the combustor without any sweetening requirement (i.e., no significant content of $H_2S$ being removed), although sweetening is not necessarily precluded. Beneficially, combustion can be carried out using sour gas without actually lessening the efficiency of the combustion cycle (efficiency being actual power production versus the theoretical power production based on the lower heating value of the natural gas fuel). This is illustrated in FIG. 4 where efficiency of power production through combustion of natural gas is shown as a function of sour gas content of the original crude oil recovery stream. As seen therein, the input based efficiency (i.e., the efficiency based on the total fuel input including the natural gas and the $H_2S$) remains essentially constant as the $H_2S$ content increases, which indicates that the presence of the $H_2S$ does not lessen process efficiency. The use of the sour gas, however, can be characterized as being beneficial in comparison to the use of pure natural gas because the fuel based efficiency (i.e., the efficiency based only on the potential power production of the natural gas) actually shows a slight increase as $H_2S$ content increases. This is because the actual amount of natural gas being combusted decreases as $H_2S$ content increases with substantially no loss in actual power production. Combustion of the $H_2S$ as a component of the recovered natural gas stream thus can function as a simplified means for removal of the $H_2S$. For example, a natural gas stream that includes $H_2S$ can be input to a combustor with an oxidant and optionally $CO_2$ (which may be at least partially present in the natural gas stream in addition to the $H_2S$). The combustion stream (wherein the $H_2S$ has been converted to $SO_3$ via reaction with the oxygen in the combustor) can be passed through a turbine for power production (e.g., via an electric generator connected to the turbine) and then through a heat exchanger to reduce the temperature of the stream. The cooled stream (e.g., less than about 90° C., less than about 50° C., of less than about 30° C.) can have a pressure that is greater than about 8 MPa, greater than about 12 MPa, or greater than about 15 MPa. This stream then can be processed through one or more separation units, such as a condenser and an acid reactor, wherein the sulfur originally input as $H_2S$ is removed as sulfuric acid in the acid reactor.

Although the recovered fossil fuel stream may contain one or more impurities (including $CO_2$), in various embodiments, the inventive systems and methods can be characterized as venting to the environment only one or more of separated fossil fuels (which are collected for sale or direct use), electricity, and controlled, safe waste streams that also are collected and safely removed from the system. This may be achieved in light of specific processing that can be applied to the recovered fossil fuel stream, which processing can be customized based on the actual makeup of the stream.

For example, a recovered stream may contain significantly only fuel material and $CO_2$. As described above, such mixture of materials may undergo a separation process to withdraw fuel materials that may be condensed at the give pressure or otherwise are in a liquid state under ambient conditions. Thus, a saleable product stream of liquid fuel material can be provided. The remaining stream may consist essentially of fuel material (particularly light hydrocarbons or gaseous hydrocarbons) and $CO_2$, and this stream may be used directly as combustion fuel in the defined combustion process. In this manner, the defined combustion process can have the characteristic of recovering virtually 100% of the total $CO_2$ in its fuel feed (including any $CO_2$ resent)—i.e., with virtually zero emission of $CO_2$ to the atmosphere. Moreover, since any recovered mixture of $CO_2$ and gaseous hydrocarbons can be delivered directly to the combustion process, there is no need to separate $CO_2$ from the low molecular weight hydrocarbons, such as using the absorption processes, physical separation, or hybrid solution required in the known art.

In certain embodiments, an oil production process according to the invention can involve the production from the well of a high pressure fluid which must be reduced in pressure to separate a liquid oil fraction and a gas stream. Such situation has been described above in relation to a down-hole combustion embodiment, but such disclosure likewise can apply to surface combustion systems and methods.

The pressure reduction for separation of liquid oil fractions and gaseous hydrocarbon fractions (which typically will include any $CO_2$ fraction) can be carried out in a number of stages with gas separation at each stage to minimize gas recompression power. The pressure letdown in stages also has the benefit of fractionating the off-gases in a more controlled fashion, thus allowing the separation of gas for commercial dispersion. This may be particularly useful where one or more of these fractioned gases has a commercial value. The gas stream which degasses at a particular pressure level could be further processed for collection as opposed to being returned to the process for combustion. The residual gas stream can contain a very large fraction of $CO_2$. Again, the invention thus can overcome the limitations in the known art—i.e., the requirement that recovered, gaseous hydrocarbon streams be treated in process units, such as the Ryan-Holmes and LTX, to produce pipeline grade natural gas, liquid propane gas (LPG), and a $CO_2$ fraction that is recycled for further recovery methods.

In enhanced oil recovery methods, it is common for the deposit recovery stream to comprise mixtures of crude oil, gaseous hydrocarbons (e.g., methane), and water in a variety of proportions, depending upon the exact nature of the formation. In some embodiments, known techniques and processes for fractional distillation may be utilized for separation of components of the recovery stream. Desirable procedures for isolating desired fractions thus may be identified in light of the totality of the present disclosure in combination, as useful, with known art procedures. As one example, to process the mixtures for component separation, it can be desirable for the recovery stream to be in a favorable temperature range—e.g., about 10° C. to about 50° C., about 15° C. to about 40° C., or otherwise ambient surface temperatures at the formation site. Other processing temperatures are not excluded and may in fact be desired in some embodiments. It is understood, however, that the following discussion in relation to process pressures may vary based upon the exact temperature of the recovery stream. Accordingly, in some embodiments, it may be desirable for the recovery stream to be temperature adjusted prior to undergoing any pressure letdown separation steps or even during the pressure letdown steps (e.g., raising or lowering temperature before transitioning the stream from one process pressure to a further, different process pressure.

As an example, a recovery stream comprising an oil/gas/water mixture may be recovered at a pressure of greater than about 60 bar (6 MPa), greater than about 75 bar (7.5 MPa), greater than about 90 bar (9 MPa), or greater than about 100 bar (10 MPa). When the stream is processed at a temperature of about 15° C. to about 40° C., the pressure of the stream may first be reduced to about 50 bar (5 MPa). At this pressure, possible components of the mixture that may be withdrawn in gaseous form include $CH_4$, $C_2H_2$, $C_2H_4$, $H_2$, Ar, $N_2$, and He. Substantially all of the $CO_2$ present in the stream likewise would be withdrawn as a gas at this pressure. The pressure of the stream may then be reduced to about 7 bar (0.7 MPa). At this pressure, possible components of the mixture that may be withdrawn in gaseous form include $C_2H_6$, all $C_3$ compounds (e.g., $C_3H_8$), and $H_2S$. The pressure next may be reduced to about 2 bar (0.1 MPa). At this pressure, possible components of the mixture that may be withdrawn in gaseous form include all $C_4$ compounds (e.g., $C_4H_{10}$), and additional $H_2S$. The recovery stream thereafter consists mainly of water, oil, and any residual $H_2S$ (although there may be up to about 3 g/L of $H_2S$ dissolved in the water at this temperature and pressure, and the oil fraction may also include residual amounts of $H_2S$ dissolved therein). Such mixture may be reduced to ambient pressure at this point and processed through an oil/water separator. Recovered oil can be sent to tanks, a pipeline, or other storage or transfer means as desired. Separated water may be re-injected into the same formation or a different formation, or the water may be stored or transferred off-site.

It is understood that further and/or different pressure stages may be used to isolate specific components of a recovered stream. Moreover, any combination of pressure letdown stages that may be envisioned in light of the present disclosure is encompassed herein. Once the chemical composition of a recovery stream is identified, the foregoing scheme may be particularized to the specific chemical composition to partition off specific components of the recovery stream as desired.

In certain embodiments, it may be desirable to isolate a methane gas stream (or streams comprising methane and/or other gaseous hydrocarbons—include combinations of gaseous compounds that may be commercially recognized as natural gas) from a recovery product stream. Such recovery product stream could be a crude oil stream, as discussed above, that includes a gas fraction. In such embodiments, the high pressure fraction described above may be withdrawn and further processed to isolate one or more desired product streams. In other embodiments, the recovery product stream may comprise mainly gaseous materials, such as in enhanced recovery from a natural gas formation or in enhanced coal bed methane production. In such embodiments, the recovery stream may comprise methane, other gaseous fuels, and/or non-fuel gases, such as inert gases or $CO_2$. In some embodiments, separation of the gaseous components may be achieved through known techniques in light of the present disclosure.

As an exemplary embodiment, a recovery product stream comprising materials, such as $CH_4$, $C_2H_2$, $C_2H_4$, $H_2$, Ar, $N_2$, He, and $CO_2$, may be separated into three streams. The first stream may include components, such as Ar, $N_2$, He, and $H_2$. The second stream may include $CH_4$ predominately, and possibly small amounts of $C_2H_2$, $C_2H_4$, $C_2H_6$, and $C_3$ hydrocarbons (which mixture may be recognized as a natural gas stream). The third stream may include predominately $C_2H_2$ and $C_2H_4$, and may include small amounts of $C_2H_6$, and $C_3$ hydrocarbons. The above distillation procedure may be carried out at significantly low temperatures—e.g., about −150° C. to about −100° C. Under such conditions, the differential vapor pressures of the gases can be used to effect the distillations. A variety of temperatures and pressures can be used to effect the distillations which depend on the composition of the crude gas stream and the desired purities of the natural gas product stream (or other gas product stream). Such conditions may be identified in light of the present disclosure and distillation procedures recognized in the art.

The incorporation of power production components can be useful to provide electricity for grid distribution and/or internal use. Associated power cycle components can essentially function as scrubbers to capture all polluting byproducts (such as sulfur, nitrogen, ash, heavy metals, and the like) and convert them to their most benign and easily saleable or disposable forms. Sulfur can be converted to sulfuric acid; nitrogen compounds can be converted to nitric acid; metals can be converted to metal salts; ash can be converted to non-leachable ash. In various embodiments, the power output can be varied from a small percentage of the total energy of mined fuel material to a large percentage. It could be 100% in the case of coal, where the electricity is more valuable than the coal unless the coal is to be converted into liquid fuels like gasoline, in which case, the electricity production can be only be enough to power the process systems. This may be in the range of about 10% to about 50%, about 15% to about 40%, or 20% to 35% of the total energy of the mined fuel material. In embodiments wherein the product being mined is oil, the electrical generation can be minimized to only what is necessary to run the associated systems. For example, in enhanced oil recovery, about 1% to about 10%, about 1% to about 7%, or about 2% to about 5% of the total energy of the mined oil may be converted into energy on-site.

In the various manners described above, the present invention thus can provide a combustion process that produces a pure $CO_2$ stream at high pressure for injection into a formation to enhance removal of a deposit therefrom, particularly a fossil fuel deposit. Although the combustion process can require input of a carbonaceous material (including oil, natural gas, etc.), the produced $CO_2$ stream can contain substantially all of the $CO_2$ that was present in the fossil fuel feed to the combustor. Thus, the inventive methods may be characterized as combusting a fossil fuel to enhance recovery of a further fossil fuel. Preferably, the amount of fossil fuel recovered through the inventive method can significantly exceed the amount of fossil fuel input to the combustion system such that the methods and systems are economically advantageous for enhancing recovery of the fossil fuel. Moreover, significantly all of the $CO_2$ produced by the combustion process is recovered as a component of the recovery stream exiting the one or more producing wells, becomes sequestered within the formation in which it was injected, or a combination of both. In any event, $CO_2$ directly produced by the combustion process is contained with the parameters of the method so as to be sequestered, recycled into the combustion process, or otherwise captured.

By way of example, a combustion system according to the present invention may comprise a combustor in fluid communication with a power production apparatus, such as a turbine. A fuel may be combusted in the combustor, and the produced, $CO_2$ containing combustion product stream can pass to the turbine where the stream is expanded to produce power. The expanded $CO_2$ containing stream then can be passed through piping or other suitable apparatus in fluid connection with the turbine to an injection well located in a fossil fuel containing formation, such piping optionally extending a distance down into the injection well. The injected $CO_2$ containing stream can propagate through the fossil fuel containing formation so as to enhance removal of the fossil fuel therefrom, such as by the various methods described herein. As the $CO_2$ containing stream propagates further through the formation, a combination of the fossil fuel and $CO_2$ from the stream may move to a low pressure zone, such as a producing well, and the combined $CO_2$/fossil fuel stream can be withdrawn from the producing well. At production, the inventive systems can comprise piping in fluid communication with the recovery well, said piping delivering the recovered deposits to one or more further components in fluid communication therewith. Such further components are already described above.

As already noted, the methods and systems of the invention can be customized to the specific requirements of the deposit to be recovered from a formation. For example, in relation to recovery of fossil fuels, the specifications of a system and method according to the invention can be customized by working through a decision tree that considers factors, such as the following:

whether the nature of the formation and the physical parameters necessary to enhance recovery favors the use of surface combustion or down-hole combustion;

whether it is desirable for the $CO_2$ delivered to the formation to be in a gaseous state or a supercritical state;

whether it is desirable for the $CO_2$ containing stream to further include steam or other material useful to further enhance recovery of the fossil fuel;

whether it is desirable for the combustion product stream to be used initially in a power production method prior to injection into the formation;

whether it is desirable for the combustion product stream to be otherwise pressure adjusted and/or temperature adjusted prior to injection into the formation; and whether it is necessary to filter or otherwise separate one or more components from the combustion product stream prior to injection into the formation.

A specific advantage of the present invention arises from the ability to use all or a fraction of the fossil fuel that is recovered as the fuel for the combustor. This can totally eliminate the need to deliver fuel from an external source to a combustor site. The type of fuel available for the combustor can vary depending upon the fossil fuel(s) present in the formation and the desired recoverable product that is the main economic driver of the well or field.

For example, in an enhanced oil recovery embodiment, the $CO_2$/fossil fuel stream can be processed to separate any liquid oil or other liquid hydrocarbons present. An initial decompression step may be used, such as described above. The total gas stream removed from the liquid separation may be optionally recompressed and then may be directly input to the combustion process as all or part of the required combustion fuel. If the residual, gaseous hydrocarbon fraction exceeds the combustion fuel requirements, further separation steps, as described above, may be applied to isolate one or more hydrocarbon gas components for market.

As a further example, in an enhanced natural gas recovery embodiment and/or an enhanced coal bed methane recovery embodiment, the total hydrocarbon gas production (the major portion being methane) preferably will significantly exceed the fuel requirements for the combustion process. Accordingly, the total recovered $CO_2$/methane stream can be separated into two or more fractions. One fraction (representing a portion of the total produced gas stream) may be optionally recompressed and then be input directly into the combustion process as the combustion fuel. The remaining fraction(s) may undergo various separation processes as required to isolate the methane (or other sellable gases, such as propane and butane) for market. Preferably, substantially all of the $CO_2$ will be partitioned into the first fraction that is used as the fuel component. In such embodiments, the produced methane stream may be input directly to a natural gas pipeline substantially without any need for purification except possible LPG recovery. Likewise, when the total gas component in an enhanced oil recovery method is used as the combustion fuel, the products from the enhanced oil recovery system can be substantially only oil, (optionally) LPG, and (optionally) electricity.

The systems and methods of the invention can be particularly advantageous for even further reasons. For example, the inventive systems and methods can reduce the operating costs and/or capital costs required for extraction of fossil fuels. Additionally, the systems and methods can create valuable by-products including, but not limited to, electricity, ammonia, oil, syn-gas, hydrogen, petroleum and petroleum products, natural gas, other fossil fuels, thermal heat, steam, and other materials that would be evident to the skilled person armed with the present disclosure. Further the inventive methods can eliminate any requirement for external natural gas, liquid fuel, or solid fuel that may be required in a combustion process. Still further, the inventive methods can eliminate any requirement for separation of $CO_2$, sulfur, CO, petroleum gases, or other impurities.

In additional embodiments, the combustion process used to produce the $CO_2$ according to the invention can burn all impurities included in the recovered fossil fuel stream to a form which provides easily treated waste streams. For example, all sulfur compounds can be converted to sulfuric acid, which be easily reacted at minimal capital and operating costs with limestone to form saleable gypsum or can be produced as solid sulfur.

The present invention is further beneficial in that a reliable, consistent, clean source of $CO_2$ can be provided for use as and enhanced recovery fluid. The direction of the $CO_2$ produced as a by-product of power production to the recovery method beneficially prevents immediate release of the $CO_2$ to the atmosphere since the $CO_2$ rather will be sequestered in the fossil fuel reservoir after down-hole pumping for recovery purposes or will be recycled through the combustion system. The amount of $CO_2$ sequestered in the formation can depend upon the miscibility of the oil and the geology of the reservoir. The $CO_2$ that is not deposited in the reservoir can be recompressed and recycled for additional enhanced fossil fuel recovery. The ratio of recycled/new $CO_2$ for injection, and therefore the amount of $CO_2$ stored in the reservoir, can range from 0 to abut 3 depending on the parameters specified above as well as the life of the well. In certain embodiments, the average rate can be such that approximately 50% by mass of the injected $CO_2$ is recycled and, therefore, approximately 50% by mass of the injected $CO_2$ can be sequestered in the reservoir, displacing the fossil fuels coming up to the surface.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for recovering a fuel material deposit from a formation, the method comprising:
   providing a combustion fuel and an oxidant into a combustor positioned above ground;
   combusting the combustion fuel to provide a $CO_2$ containing stream comprising supercritical $CO_2$;
   expanding the $CO_2$ containing stream across a turbine adapted for power generation to form an expanded $CO_2$ containing stream; and
   injecting at least a portion of the $CO_2$ from the expanded $CO_2$ containing stream into the formation including the fuel material deposit for recovery such that at least a portion of the fuel material in the formation and at least a portion of the $CO_2$ stream flow from the formation and into a recovery well.

2. The method of claim 1, further comprising, prior to said injecting step, passing the expanded $CO_2$ containing stream sequentially through a heat exchanger that cools the $CO_2$ containing stream and through one or more separators that removes one or more secondary components present in the $CO_2$ containing stream.

3. The method of claim 2, further comprising, prior to said injecting step, separating the $CO_2$ containing stream into an injection $CO_2$ stream that is injected into the formation and a recycle $CO_2$ stream that is provided into the combustor as a working fluid.

4. The method of claim 3, further comprising, one or more of compressing the recycle $CO_2$ stream by passing the stream through a compressor and heating the recycle $CO_2$ stream by passing the stream through the heat exchanger that cooled the expanded $CO_2$ containing stream.

5. The method of claim 4, further comprising providing the recycle $CO_2$ stream into the combustor as the working fluid.

6. The method of claim 5, wherein the recycle $CO_2$ stream is provided into the combustor at a pressure of at least about 2 MPa.

7. The method of claim 5, wherein the combustor is a transpiration cooled combustor, and wherein at least a portion of the recycle $CO_2$ stream is provided into the transpiration cooled combustor as at least a portion of a transpiration fluid used to cool the transpiration cooled combustor.

8. The method of claim 5, wherein the recycle $CO_2$ stream provided into the combustor has a purity of at least 95% molar.

9. The method of claim 1, wherein the expanded $CO_2$ containing stream has a pressure of at least about 1.5 MPa.

10. The method of claim 1, wherein the $CO_2$ containing stream injected into the formation has a pressure of at least about 7.5 MPa.

11. The method of claim 1, wherein the $CO_2$ containing stream injected into the formation comprises supercritical $CO_2$.

12. The method of claim 1, wherein the combusting is carried out at a temperature of at least about 400° C.

13. The method of claim 1, further comprising receiving from the recovery well a recovery stream comprising the fuel material and the $CO_2$.

14. The method of claim 13, further comprising separating the recovery stream into a recovered gas stream and a recovered liquid stream.

15. The method of claim 14, wherein the recovered gas stream comprises methane and $CO_2$.

16. The method of claim 15, wherein the recovered gas stream further comprises one or more of $C_2$ hydrocarbons, $C_3$ hydrocarbons, and $C_4$ hydrocarbons.

17. The method of claim 14, wherein the recovered liquid stream comprises petroleum.

18. The method of claim 17, wherein the petroleum comprises crude oil.

19. The method of claim 14, wherein the recovered liquid stream comprises a fluidized solid fuel material.

20. The method of claim 14, comprising directing at least a portion of the recovered gas stream to the combustor as at least a portion of the combustion fuel.

21. The method of claim 14, wherein said separating comprises directing the recovery stream through at least one pressure letdown stage at a defined pressure whereby one or more fuel material gas fractions are withdrawn and the remaining fraction of the recovery stream at the defined pressure comprises liquid fuel material.

22. The method of claim 21, wherein one or more of the fuel material gas fractions comprises the $CO_2$.

23. The method of claim 22, further comprising directing a fuel material gas fraction comprising the $CO_2$ to the combustor as at least a portion of the combustion fuel.

24. The method of claim 23, further comprising passing the fuel material gas fraction through a compressor that increases the pressure of the fuel material gas fraction prior to being introduced into the combustor.

25. The method of claim 24, wherein two or more of the plurality of fuel material gas fractions comprising $CO_2$ are combined and directed to the combustor as at least a portion of the combustion fuel.

26. The method of claim 25, further comprising passing the fuel material gas fractions through a compressor that increases the pressure of the fuel material gas fractions prior to being introduced into the combustor.

27. The method of claim 25, wherein the compressor is a multi-stage compressor.

28. The method of claim 22, wherein the one or more fuel material gas fractions comprising the $CO_2$ include at least about 95% by mass of the total $CO_2$ present in the recovery stream.

29. The method of claim 21, wherein said separating results in a plurality of fuel material gas fractions that each comprise $CO_2$.

30. The method of claim 14, comprising separating the recovered gas stream into a recovered hydrocarbon gas stream and a recovered non-hydrocarbon gas stream.

31. An apparatus for producing a $CO_2$ containing stream down-hole in a well, the apparatus comprising:
- a combustor;
- a combustion fuel supply in fluid connection with the combustor;
- an oxidant supply in fluid connection with the combustor;
- a chamber within the combustor wherein combustion of the fuel occurs at a temperature of at least about 600° C. to produce the $CO_2$ containing stream; and
- an outlet on the combustor that delivers the $CO_2$ containing stream from the combustor and into the well, wherein the outlet comprises a conically shaped nozzle that concentrates the $CO_2$ containing stream delivered therefrom.

32. A system for generating $CO_2$ and recovering a fuel material deposit from a formation, the system comprising:
- a combustor;
- a combustion fuel supply in fluid connection with the combustor;
- an oxidant supply in fluid connection with the combustor;
- a chamber within the combustor configured for receiving and combusting the combustion fuel to provide a $CO_2$ containing stream comprising supercritical $CO_2$;
- an injection component that delivers the $CO_2$ containing stream into the formation including the fuel material deposit such that at least a portion of the fuel material in the formation and at least a portion of the $CO_2$ stream flow from the formation and into a recovery well as a recovery stream; and
- one or more processing components for processing the recovered fuel material and $CO_2$ in the recovery stream.

33. The system of claim 32, wherein the one or more processing components comprises an expander that reduces the pressure of the recovery stream.

34. The system of claim 33, wherein the expander comprises a power generation turbine.

35. The system of claim 32, wherein the one or more processing components comprises one or more separation unit.

36. The system of claim 35, wherein the one or more separation units comprises a unit that separates a gas stream from a liquid stream.

37. The system of claim 32, wherein the injection component comprises a pipeline extending into a well formed in the formation.

38. The system of claim 32, wherein one or more of the combustion fuel supply and the oxidant supply comprises piping of sufficient dimensions to deliver the respective material down hole into a well formed in the formation.

39. The system of claim 32, wherein the combustor is configured for use down hole in a well formed in the formation.

40. The system of claim 32, wherein the system is sufficiently modular in construction such that the system can be reconfigured between a transportation state and a $CO_2$ generating state.

41. A method for recovering a fuel material deposit from a formation, the method comprising:
- providing a combustion fuel and an oxidant into a combustor;
- combusting the combustion fuel to provide a $CO_2$ containing stream comprising supercritical $CO_2$;
- injecting at least a portion of the $CO_2$ containing stream into the formation including the fuel material deposit for recovery such that at least a portion of the fuel material in the formation and at least a portion of the $CO_2$ stream flow from the formation and into a recovery well;
- receiving from the recovery well a recovery stream comprising the fuel material and the $CO_2$; and
- separating the recovery stream into a recovered gas stream and a recovered liquid stream.

\* \* \* \* \*